(12) United States Patent
Lee et al.

(10) Patent No.: US 9,501,214 B2
(45) Date of Patent: Nov. 22, 2016

(54) MOBILE TERMINAL AND CONTROLLING METHOD THEREOF

(71) Applicant: LG ELECTRONICS INC., Seoul (KR)

(72) Inventors: Jungbin Lee, Seoul (KR); Jungsun Lee, Seoul (KR); Bonjoon Koo, Seoul (KR); Sangsoo Kim, Seoul (KR); Kwangsu Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 14/146,615

(22) Filed: Jan. 2, 2014

(65) Prior Publication Data
US 2014/0194164 A1 Jul. 10, 2014

(30) Foreign Application Priority Data

Jan. 4, 2013 (KR) ........................ 10-2013-0001339

(51) Int. Cl.
  *H04B 1/38* (2015.01)
  *G06F 3/0485* (2013.01)
  *H04M 1/725* (2006.01)

(52) U.S. Cl.
  CPC .............. *G06F 3/0485* (2013.01); *H04B 1/38* (2013.01); *H04M 1/72519* (2013.01); *H04M 1/72583* (2013.01)

(58) Field of Classification Search
  CPC ..................... H04M 1/72519; H04M 1/72583
  USPC ............................................. 455/566; 348/36
  See application file for complete search history.

(56) References Cited

U.S. PATENT DOCUMENTS

| | | | | |
|---|---|---|---|---|
| 6,128,012 A * | 10/2000 | Seidensticker, Jr. ... | G06F 3/0482 | 345/685 |
| 6,822,664 B2 * | 11/2004 | Vale ...................... | G06F 3/0481 | 715/856 |
| 7,206,017 B1 * | 4/2007 | Suzuki .................. | G06F 3/0485 | 345/629 |
| 8,848,034 B2 * | 9/2014 | Fukuzawa .............. | G03B 17/28 | 348/36 |
| 2001/0010555 A1 * | 8/2001 | Driscoll, Jr. ........... | G02B 13/06 | 348/335 |
| 2006/0182437 A1 * | 8/2006 | Williams ........... | H04N 5/23238 | 396/429 |
| 2007/0078896 A1 * | 4/2007 | Hayashi ............ | G06F 17/30038 | |
| 2007/0081796 A1 * | 4/2007 | Fredlund ................ | G03B 31/06 | 386/225 |
| 2007/0300261 A1 * | 12/2007 | Barton ............... | G06Q 30/0241 | 725/58 |
| 2009/0197635 A1 * | 8/2009 | Kim ....................... | G06F 3/0346 | 455/550.1 |
| 2009/0290013 A1 * | 11/2009 | Hayashi ................. | H04N 5/232 | 348/36 |
| 2010/0004995 A1 * | 1/2010 | Hickman ............... | G06Q 30/02 | 705/14.58 |
| 2010/0053373 A1 * | 3/2010 | Miyamoto ............... | C12Q 1/28 | 348/231.5 |
| 2010/0177160 A1 * | 7/2010 | Tocher ................... | G02B 13/06 | 348/36 |
| 2010/0220174 A1 * | 9/2010 | Mendoza ............ | G06F 3/04815 | 348/39 |
| 2010/0321470 A1 * | 12/2010 | Oshima ................... | G03B 17/18 | 348/36 |
| 2012/0011464 A1 * | 1/2012 | Hayashi ............. | H04N 1/00469 | 715/784 |
| 2012/0239532 A1 * | 9/2012 | Sim ........................ | G06Q 30/02 | 705/26.43 |
| 2013/0086505 A1 * | 4/2013 | de Paz .................. | G06F 3/1438 | 715/773 |
| 2013/0120642 A1 * | 5/2013 | Kim .................... | H04N 5/23293 | 348/349 |

* cited by examiner

*Primary Examiner* — Mong-Thuy Tran
(74) *Attorney, Agent, or Firm* — Birch, Stewart, Kolasch & Birch, LLP

(57) ABSTRACT

A mobile terminal including a memory configured to store data; a touchscreen display; and a controller configured to: display a first portion of a panoramic file selected from the memory, said panoramic file having a display size greater than that of the touchscreen display, and scroll automatically the panoramic file in at least one direction so as to display another portion of the panoramic file.

18 Claims, 49 Drawing Sheets

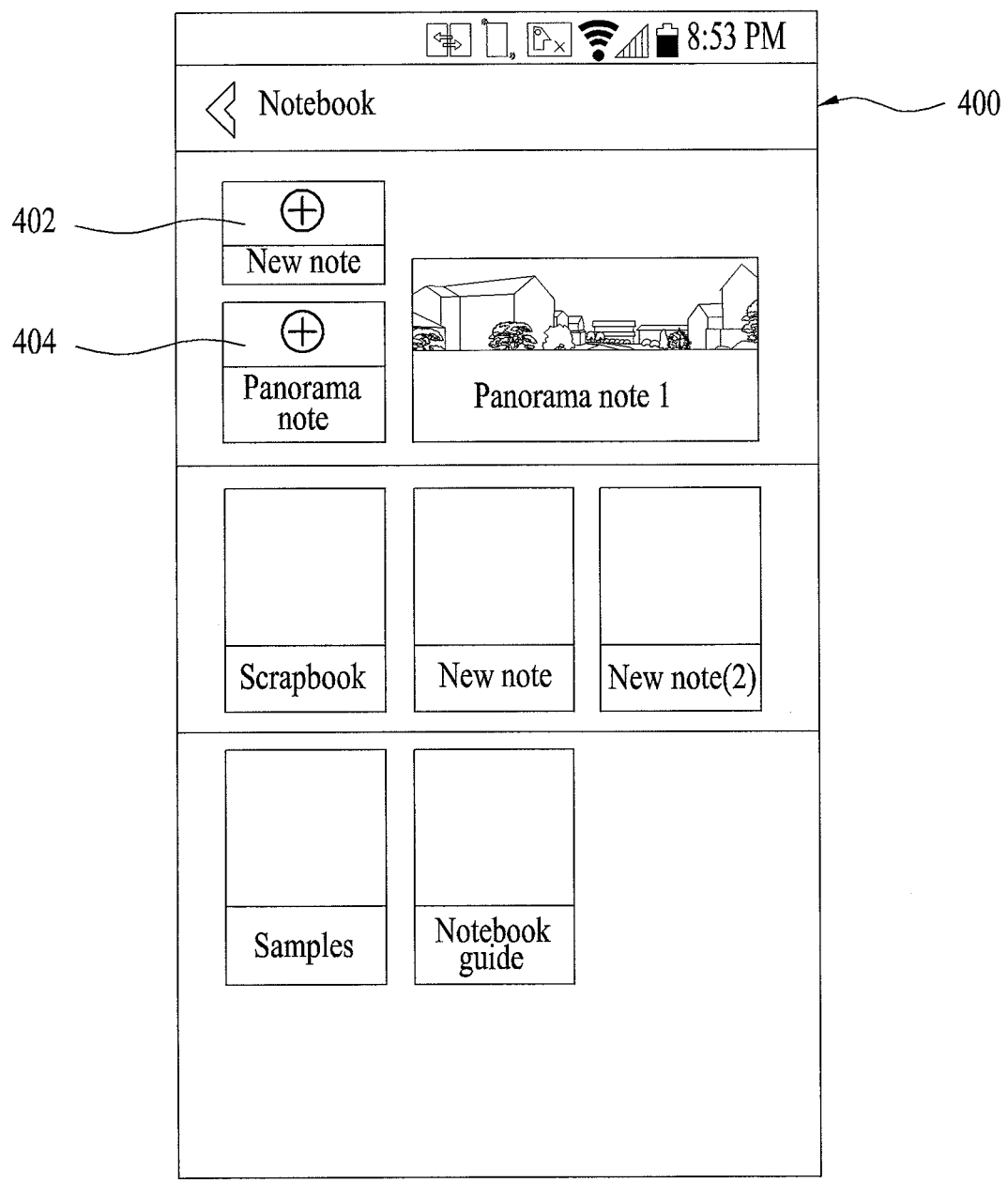

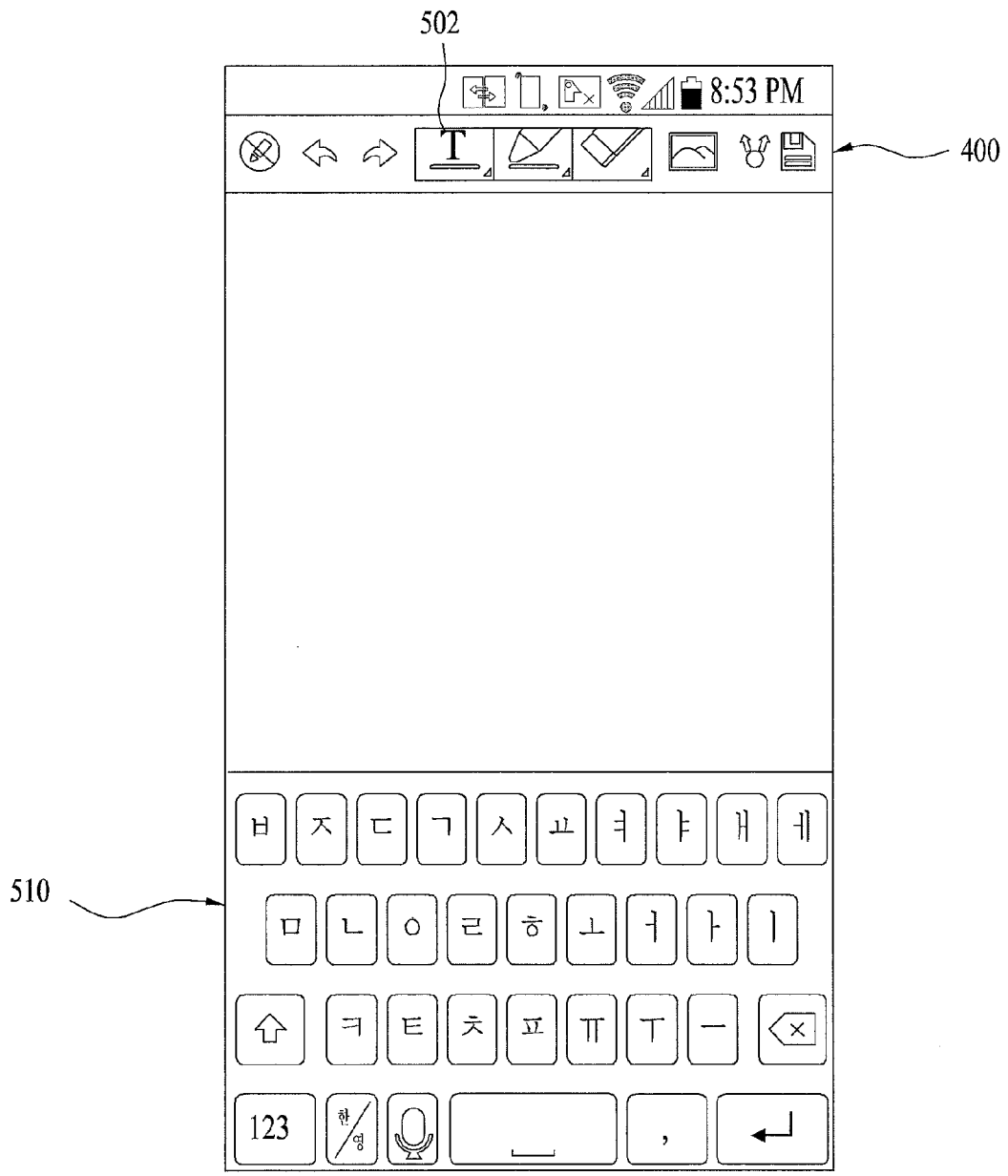

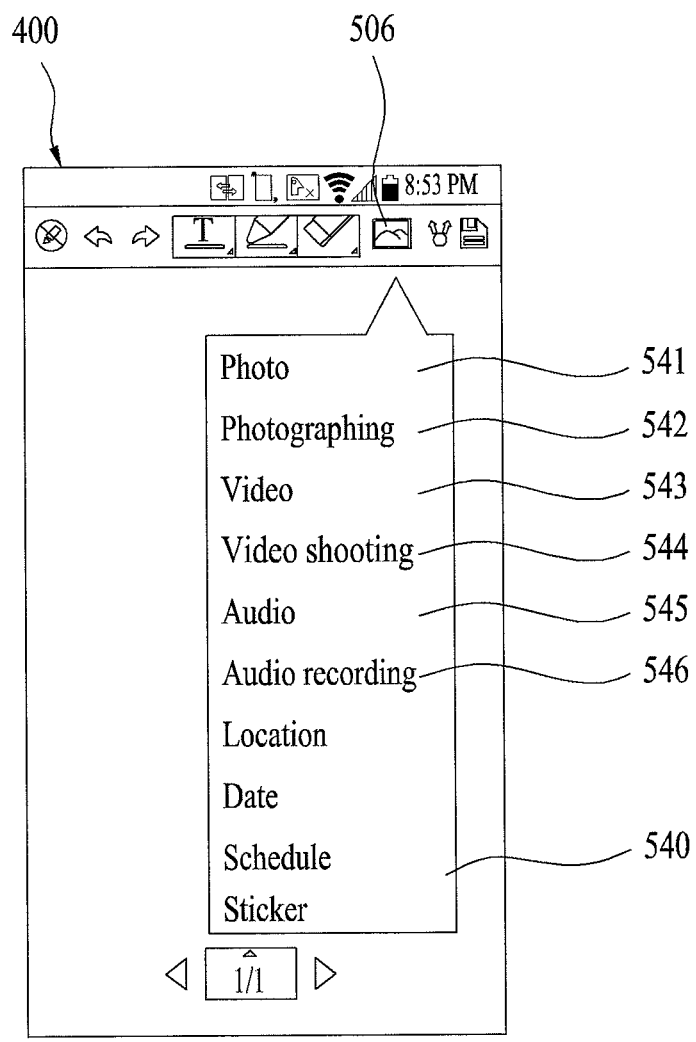

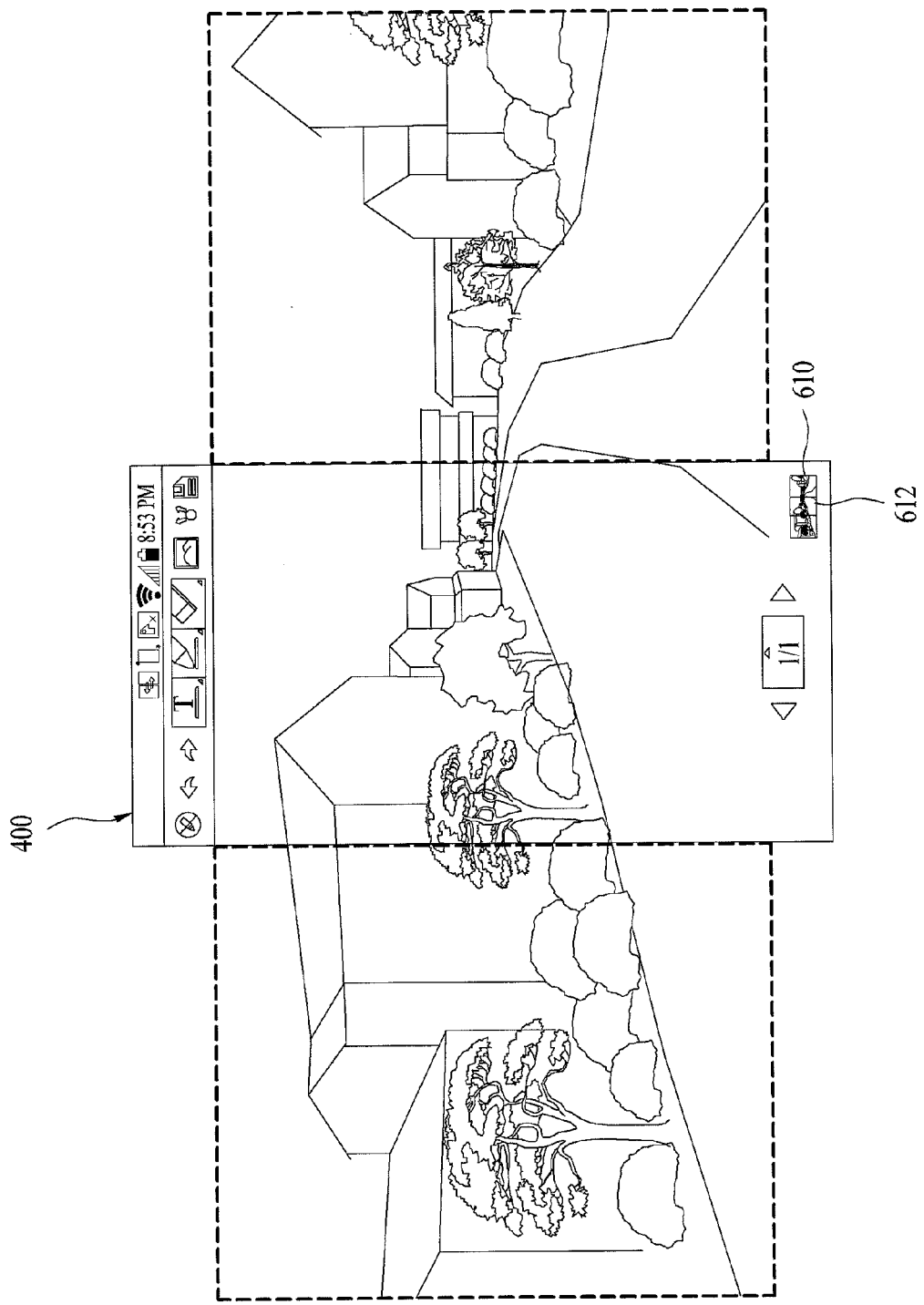

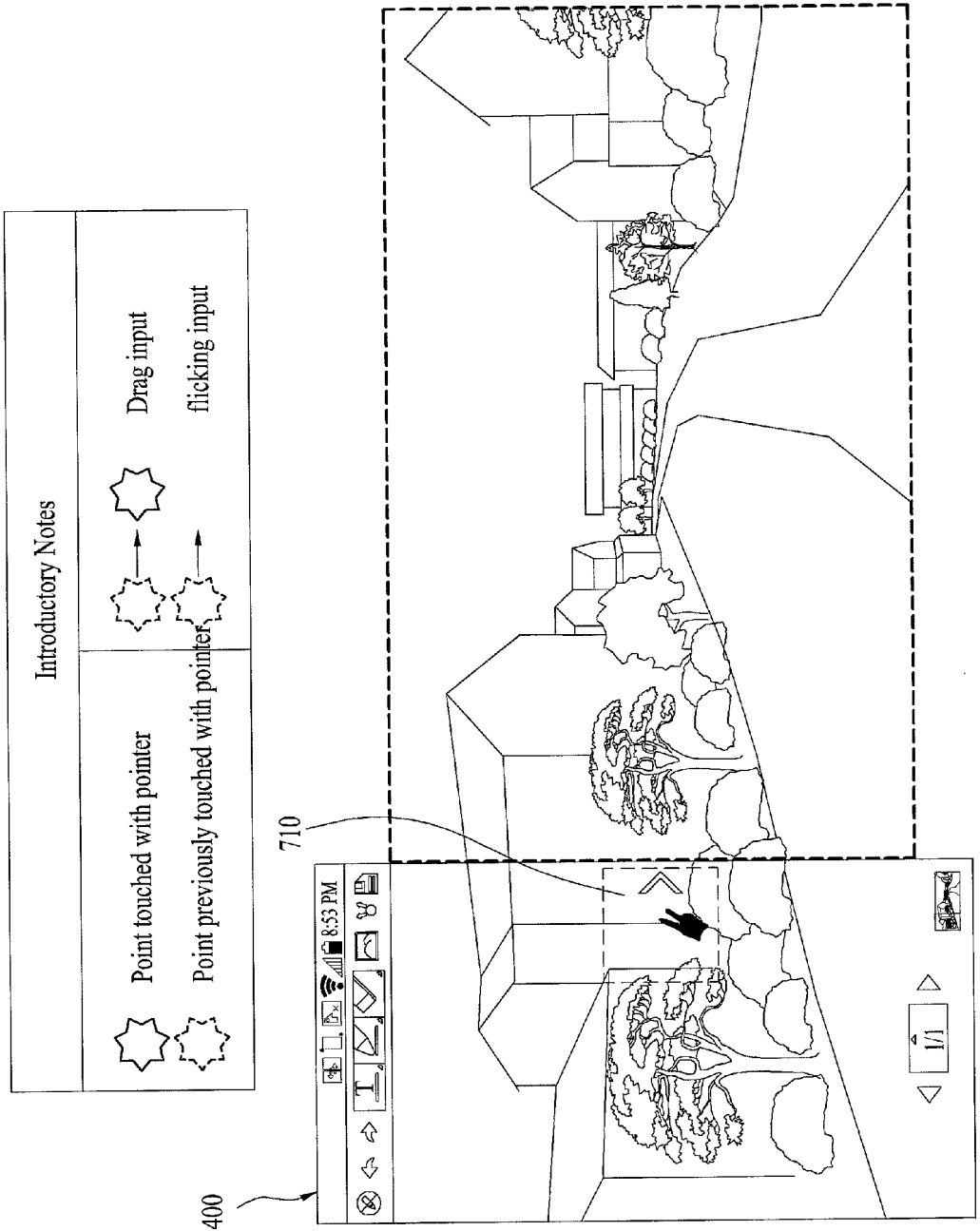

FIG. 7C
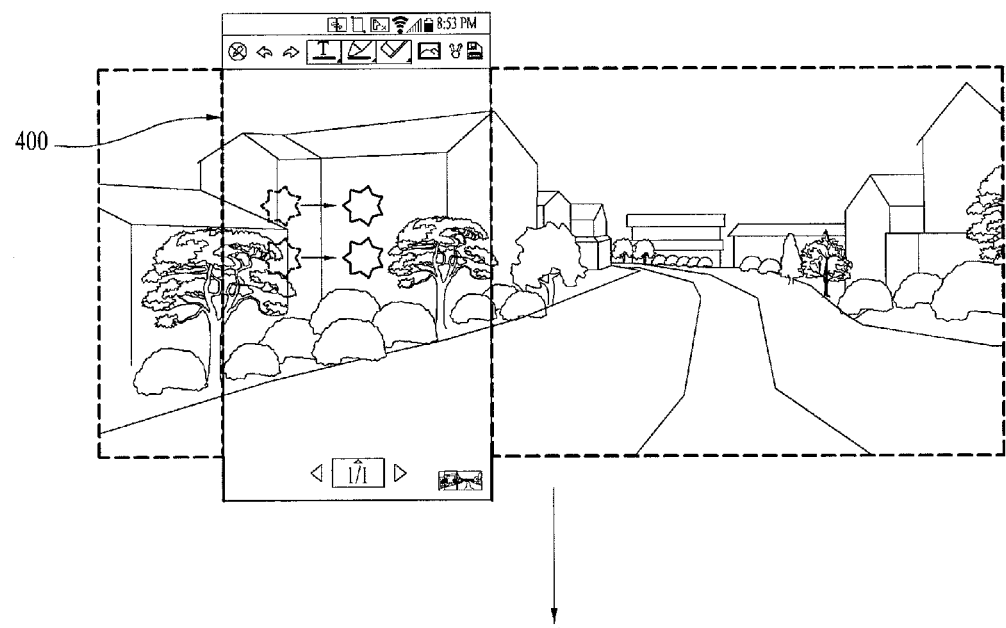
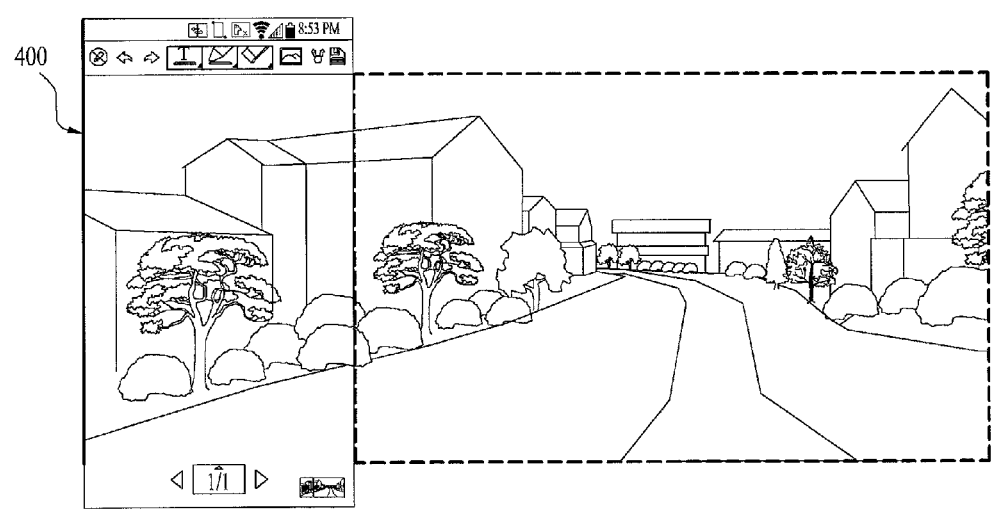

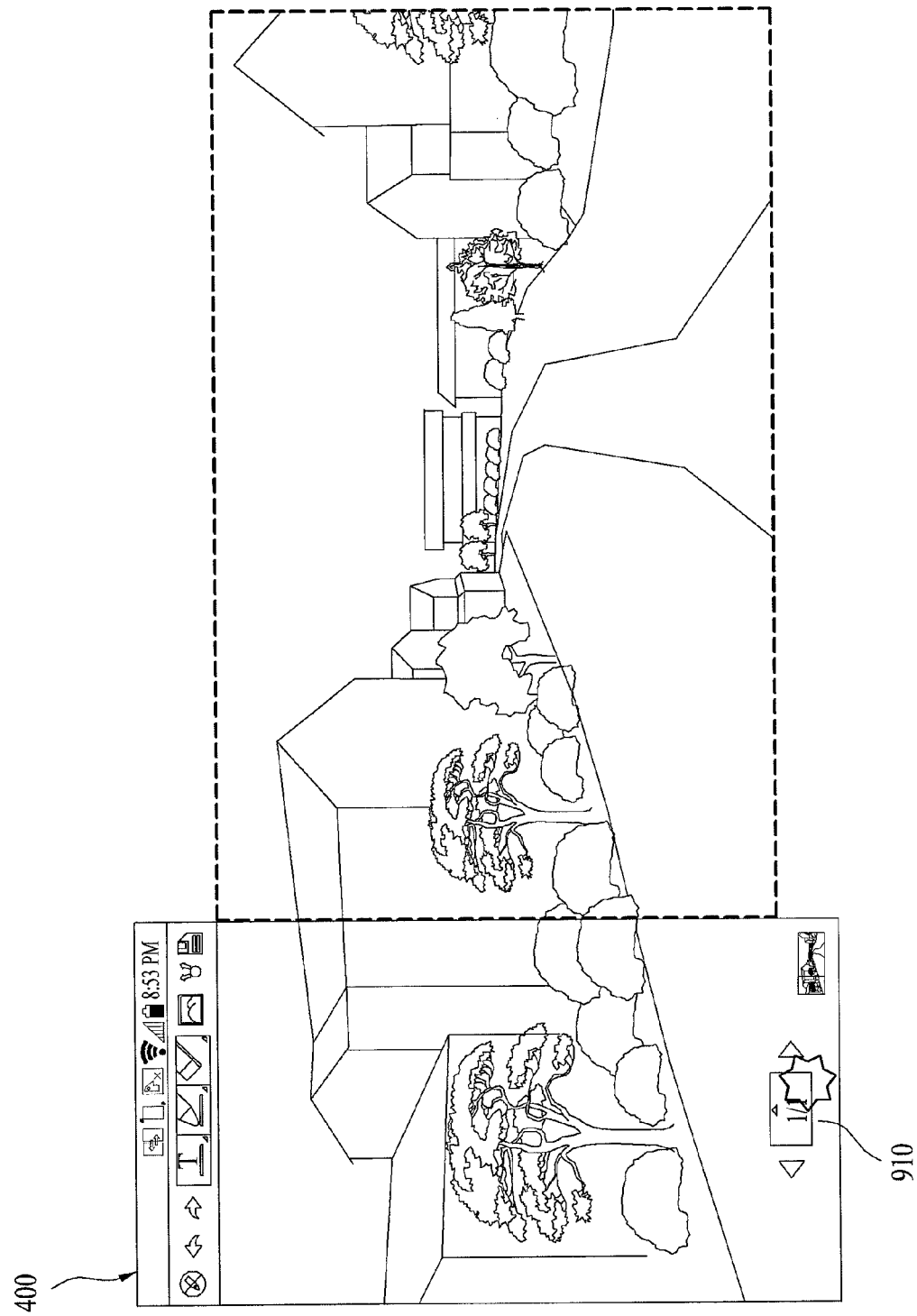

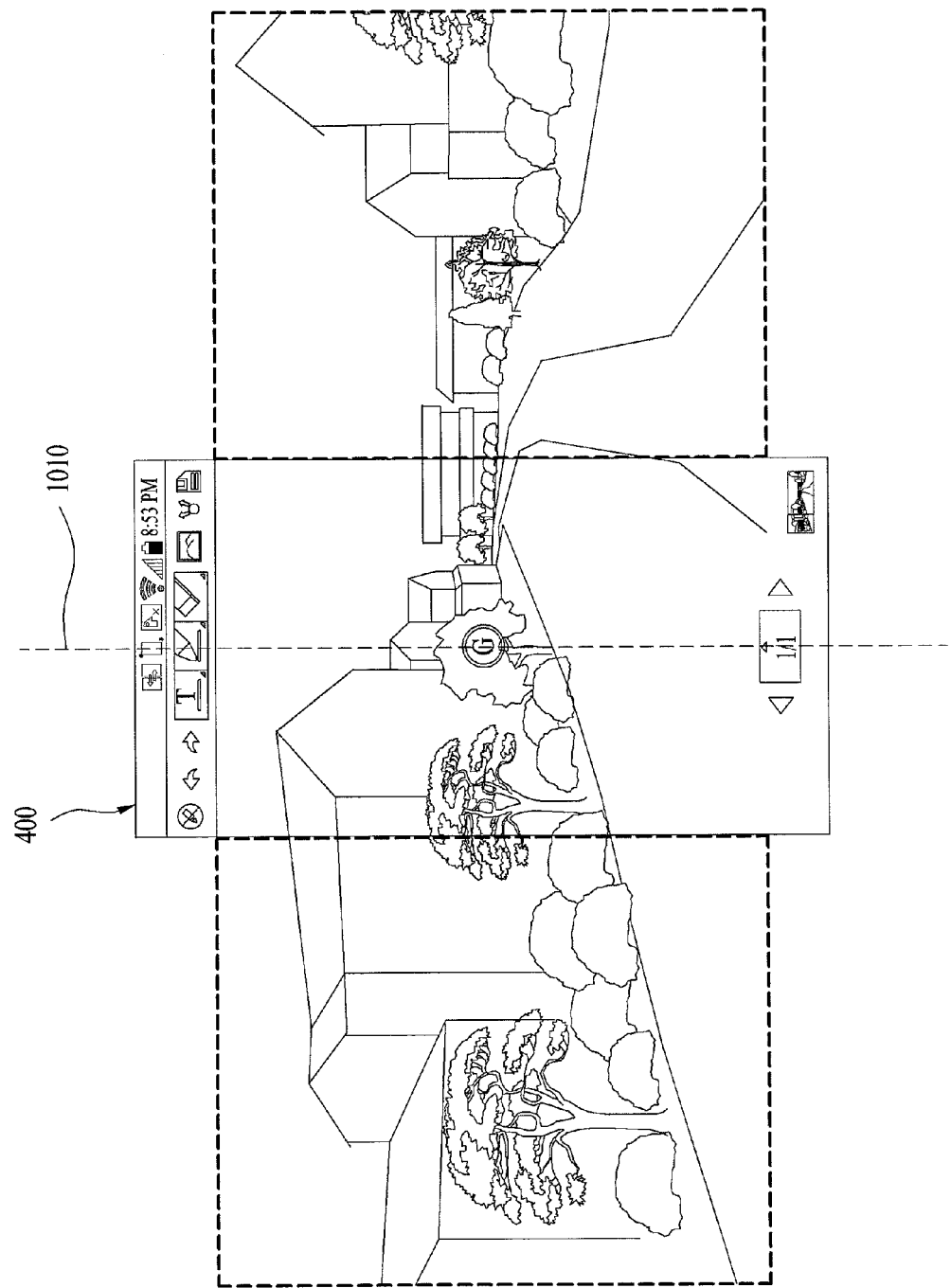

FIG. 12A
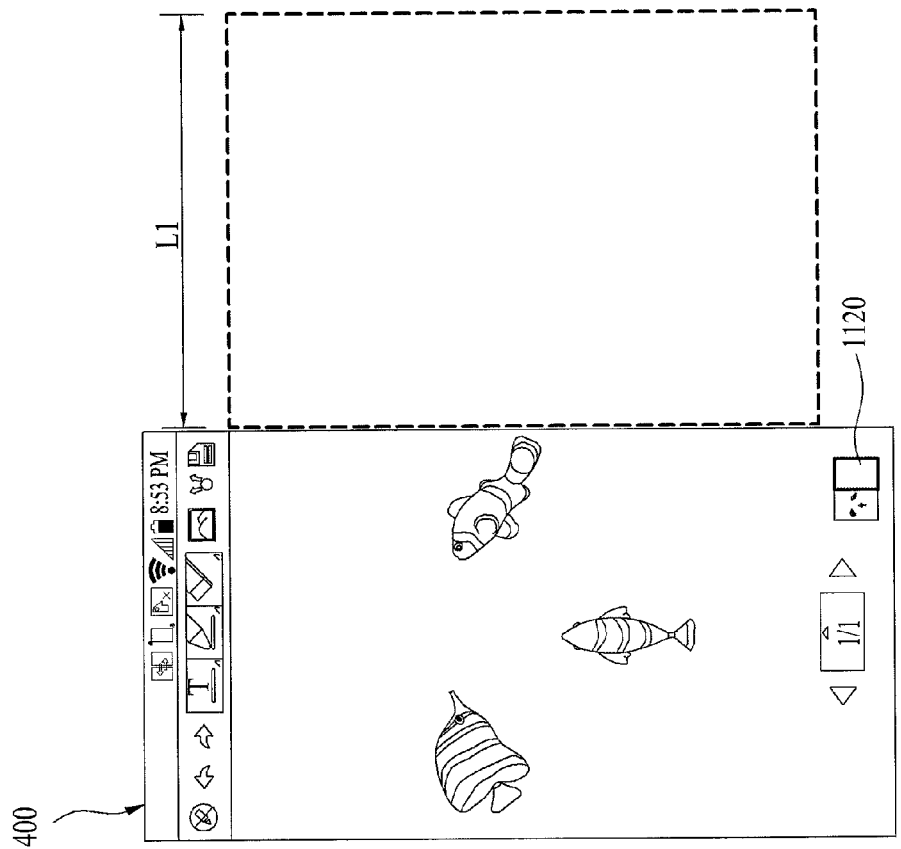
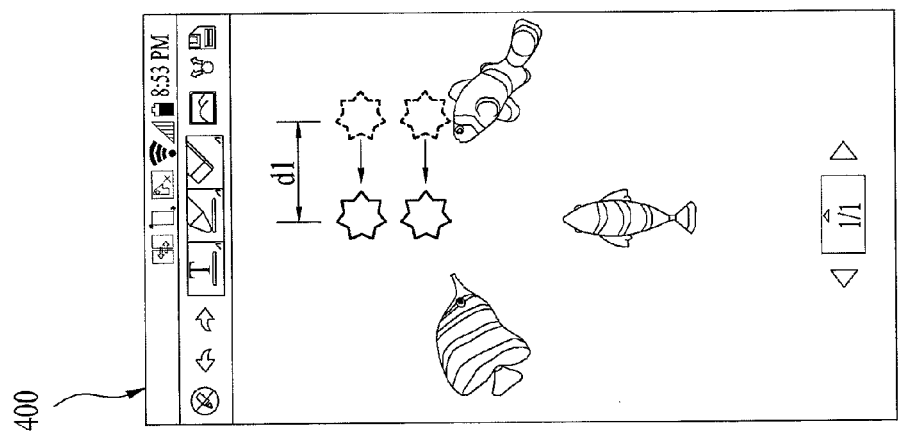

FIG. 12B
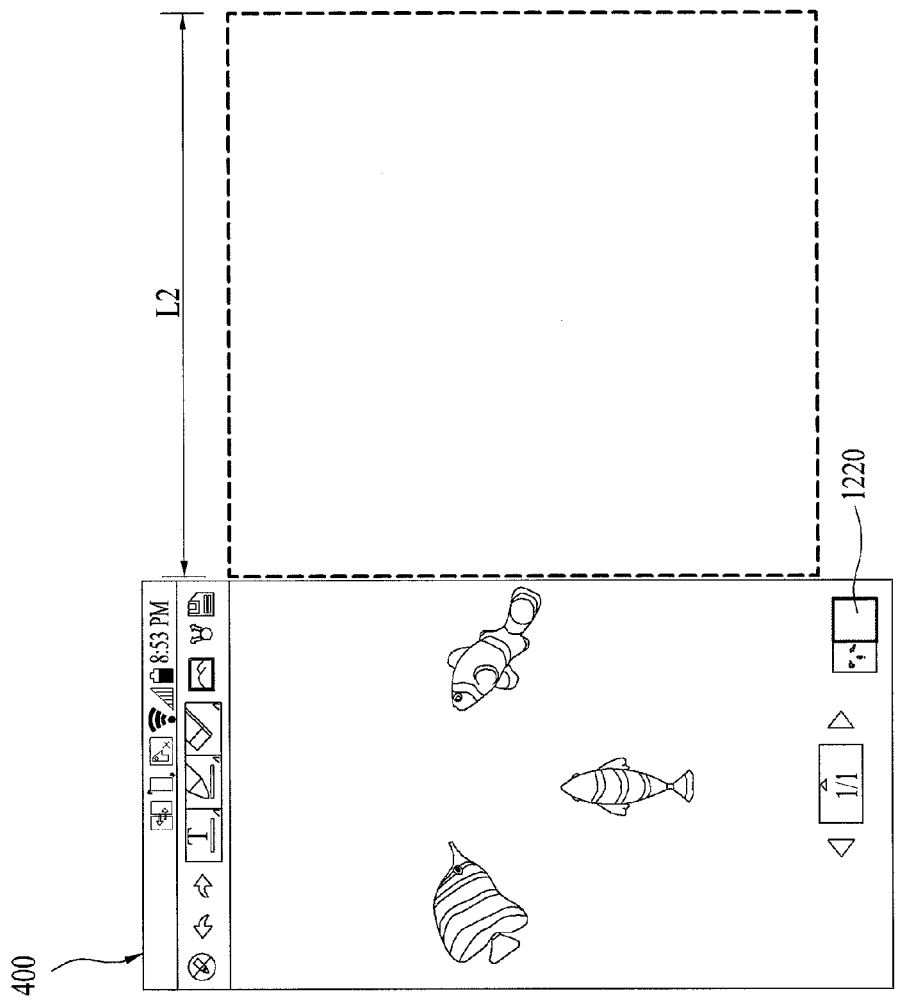
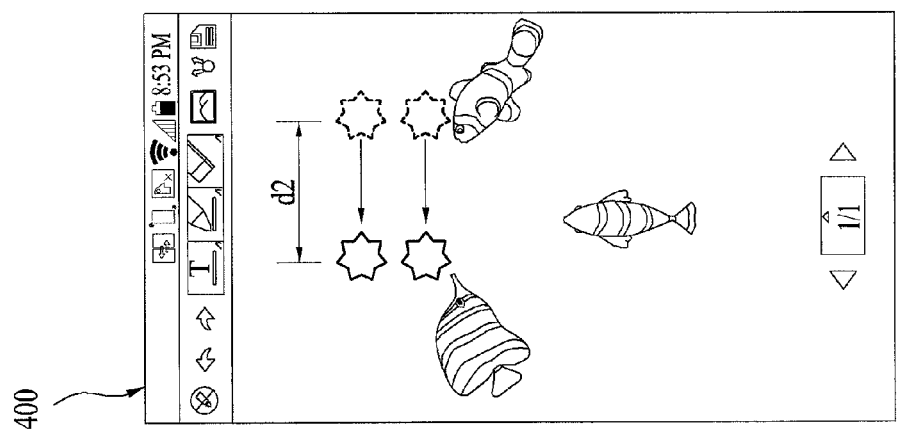

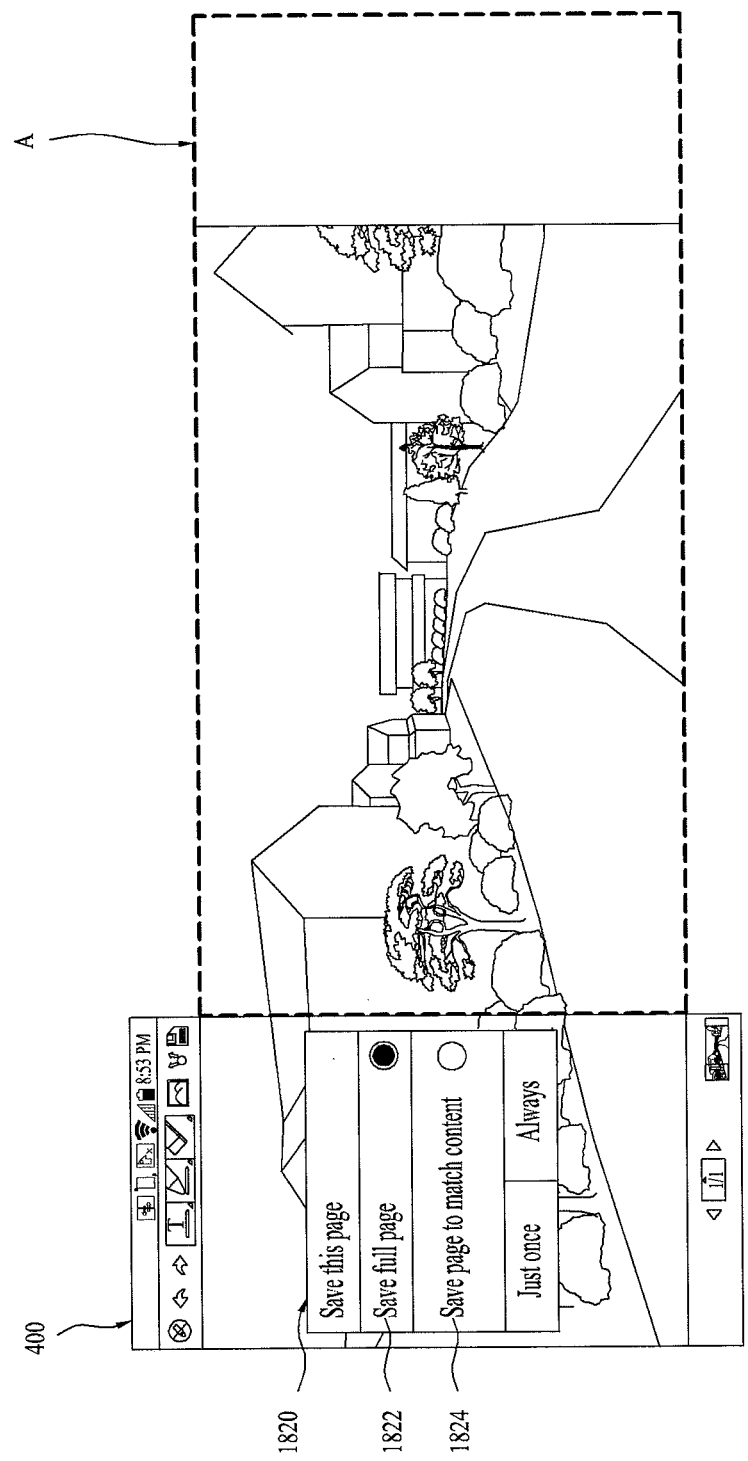

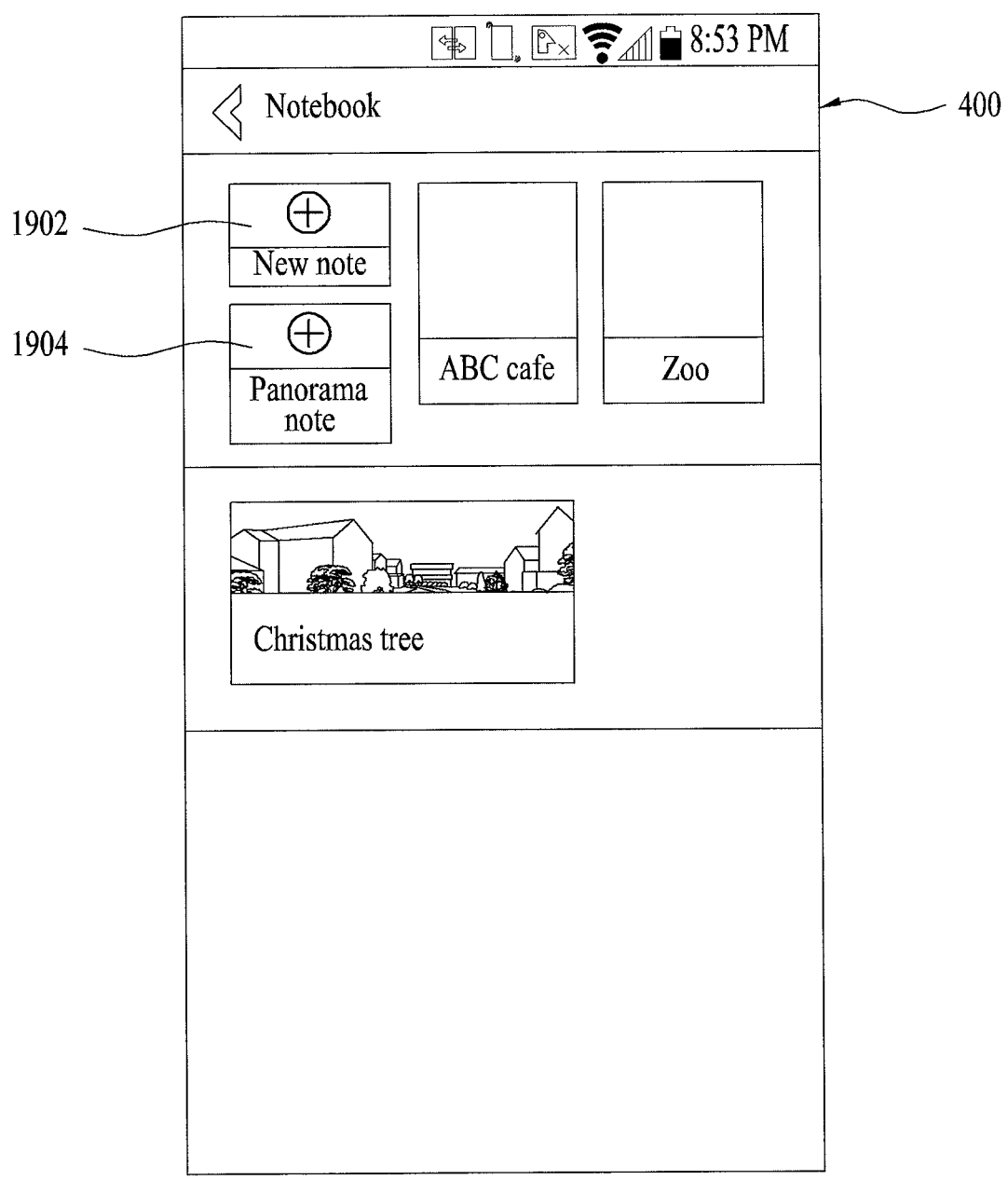

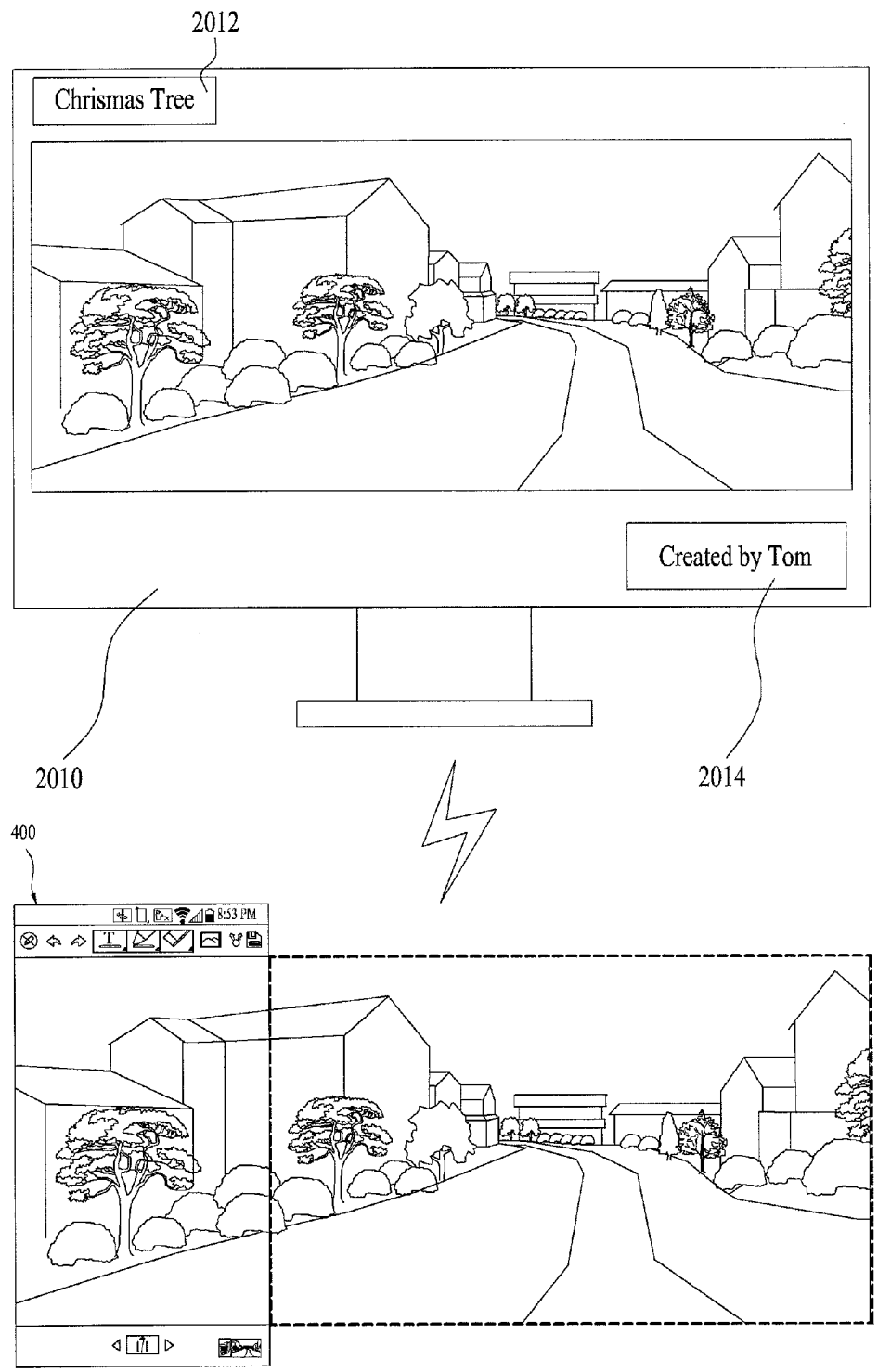

FIG. 23A
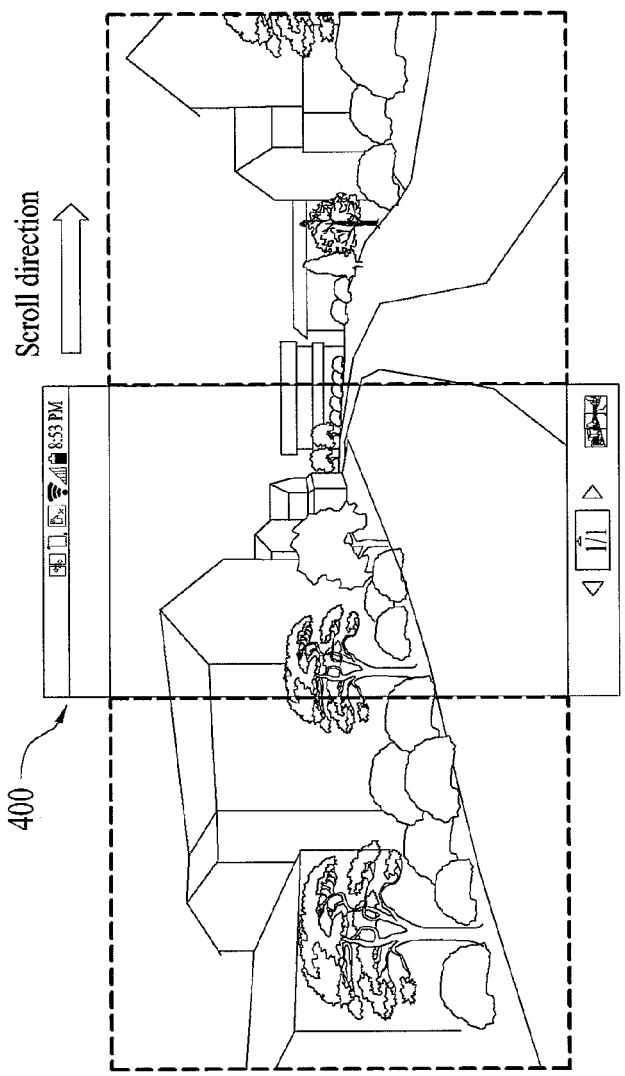
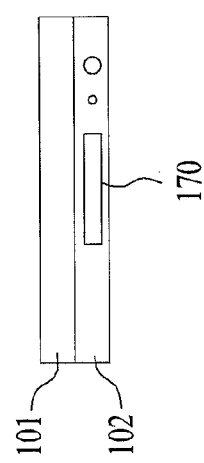

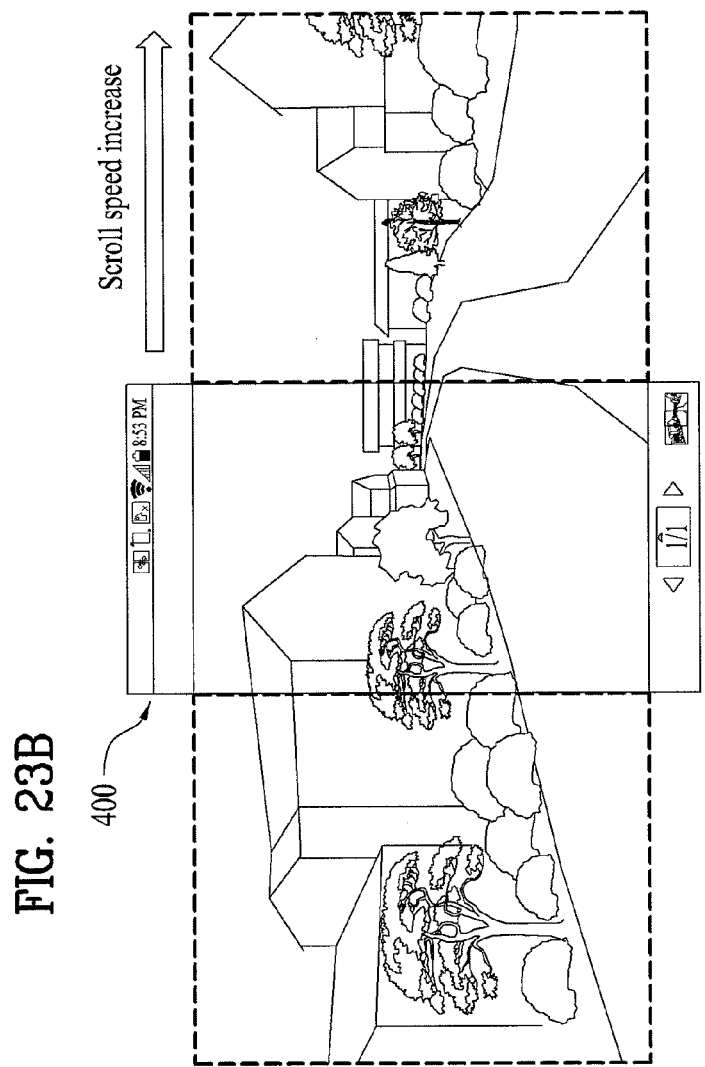
FIG. 23B
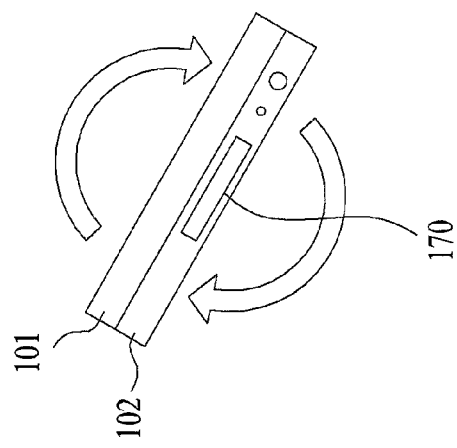

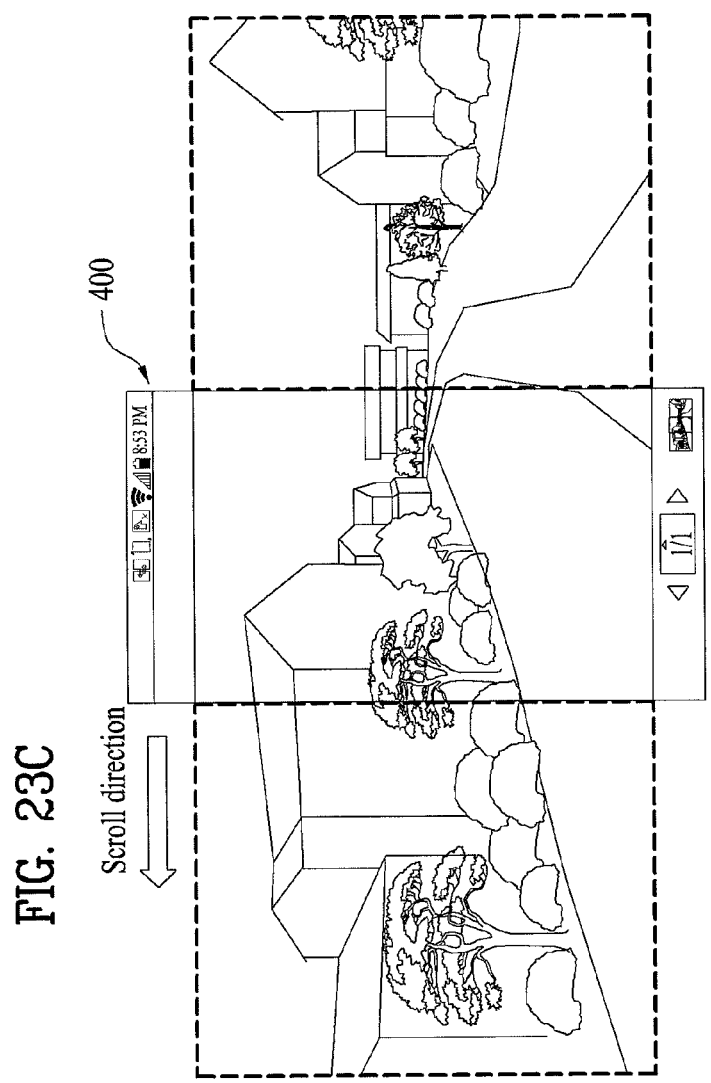
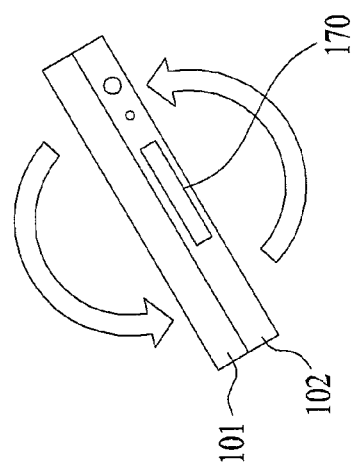
FIG. 23C

FIG. 24
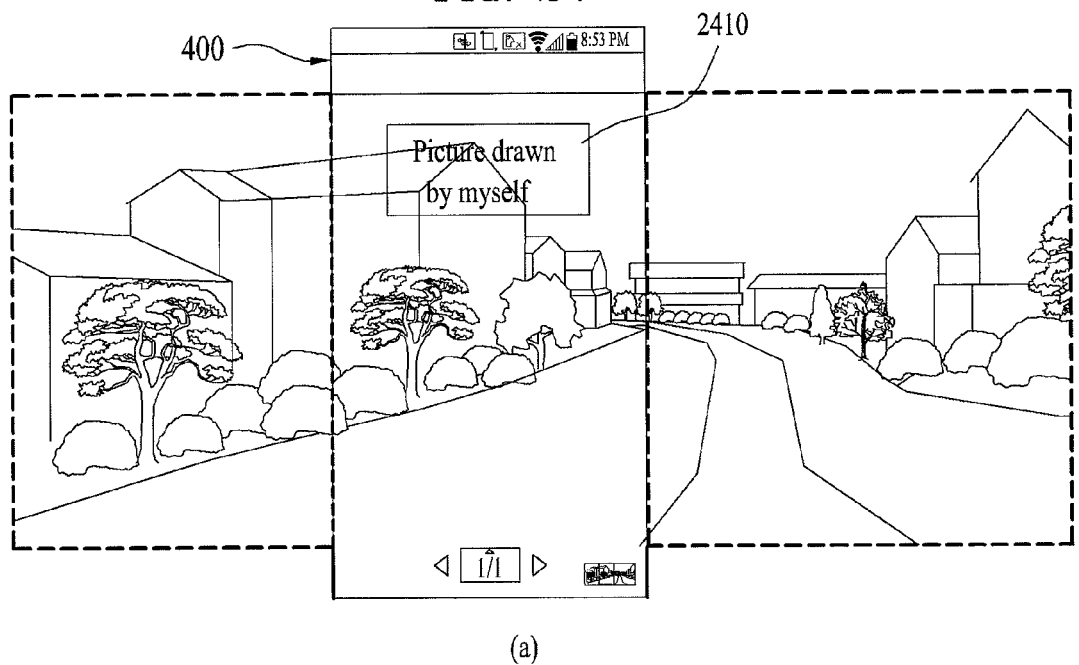
(a)
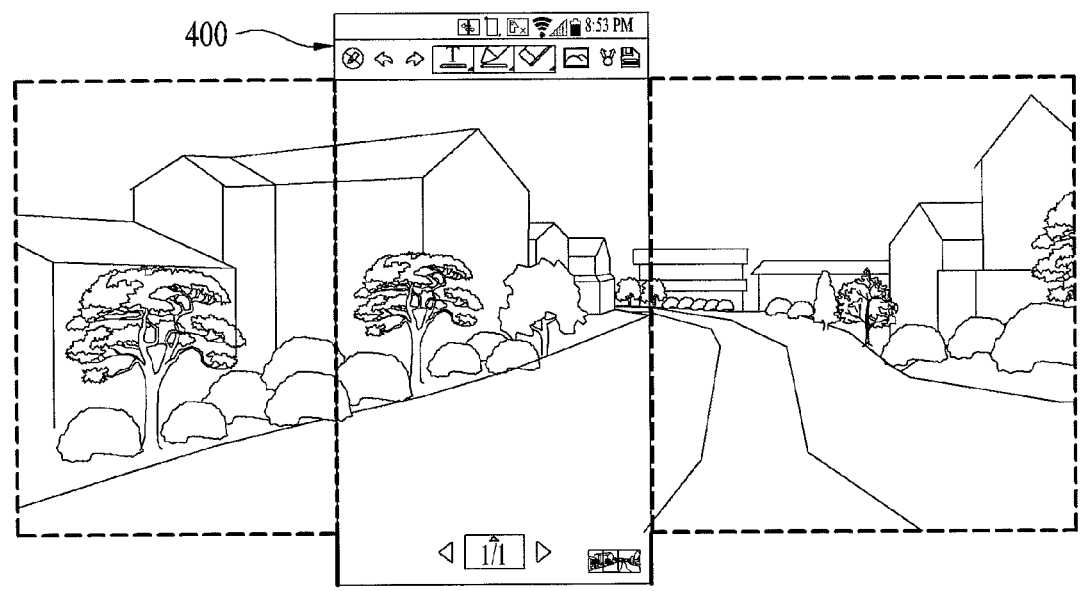
(b)

MOBILE TERMINAL AND CONTROLLING METHOD THEREOF

Pursuant to 35 U.S.C. §119(a), this application claims the benefit of earlier filing date and right of priority to Korean Application No. 10-2013-0001339, filed on Jan. 4, 2013, the contents of which are hereby incorporated by reference herein in their entirety.

BACKGROUND OF THE INVENTION

1. Field of the Invention

The present invention relates to a mobile terminal, and more particularly, to a mobile terminal, controlling method thereof and recording medium therefor. Although the present invention is suitable for a wide scope of applications, it is particularly suitable for enhancing user's convenience.

2. Discussion of the Related Art

A mobile terminal can perform various functions such as data and voice communications, capturing images and video via a camera, recording audio, playing music files and outputting music via a speaker system, and displaying images and video on a display.

Generally, terminals can be classified into mobile terminals and stationary terminals. Further, the mobile terminals can be further classified into handheld terminals and vehicle mount terminals. There are ongoing efforts to support and increase the functionality of mobile terminals. Such efforts include software and hardware improvements, as well as changes and improvements in the structural components which form the mobile terminal.

As mobile terminals have developed into portable or mobile computing devices, a word processor supportive of a text input, a handwritten input and the like is generally located on a recent mobile terminal. However, because a display size of the mobile terminal is smaller than that of a fixed-type terminal such as a computer and the like, it is still difficult to insert a considerable amount of data in a document.

Thus, when an amount of data to be inserted in a document is considerably large, the demand for a method of extending a size of the document is rising. Yet, it may not be preferable that a size of a document created in a mobile terminal is extended to insert a considerable amount of data in the document. Namely, if a size of a document becomes greater than that of a display unit of a mobile terminal, it is unable to output a full content of the document to eventually cause a problem that a user has difficulty in recognizing the full content of the document.

Accordingly, when a user intends to edit a document of which size if greater than that of a display unit of a mobile terminal, it is necessary to seek for a method of recognizing a full content of the document before editing the document.

SUMMARY OF THE INVENTION

Accordingly, embodiments of the present invention are directed to a mobile terminal, controlling method thereof and recording medium therefor that substantially obviate one or more problems due to limitations and disadvantages of the related art.

An object of the present invention is to provide a mobile terminal, controlling method thereof and recording medium therefor, by which user's convenience can be enhanced.

In particular, one object of the present invention is to provide a mobile terminal, controlling method thereof and recording medium therefor, by which a size of a document can be extended if not enough for attaching a desired amount of data.

Another object of the present invention is to provide a mobile terminal, controlling method thereof and recording medium therefor, which enables a user to recognize a full content of a document conveniently with ease before editing the document in a size greater than that of a display unit of the mobile terminal.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a memory configured to store data, a touchscreen display, and a controller configured to display a first portion of a panoramic file selected from the memory, said panoramic file having a display size greater than that of the touchscreen display, and scroll automatically the panoramic file in at least one direction so as to display another portion of the panoramic file.

In another aspect of the present invention, a method of controlling a mobile terminal according to one embodiment of the present invention may include displaying, via a touchscreen display, a first portion of a panoramic file selected from a memory of the mobile terminal, said panoramic file having a display size greater than that of the touchscreen display, and scrolling automatically, via a controller of the mobile terminal, the panoramic profile in at least one direction so as to display another portion of the panoramic file.

Effects obtainable from the present invention may be non-limited by the above mentioned effect. Further, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 4 is a diagram illustrating one example to describe that a panorama document is created;

FIGS. 5A to 5C are diagrams illustrating one example to describe an editing mode of a document;

FIGS. 6A to 6C are diagrams illustrating one example to describe a process for scrolling a panorama document using a mini-map;

FIGS. 7A to 7C are diagrams illustrating one example to describe a process for scrolling a panorama document in right/left direction in response to a user's touch input;

FIG. 9A and FIG. 9B are diagrams illustrating one example to describe a process for displaying a thumbnail of a panorama document on a touchscreen;

FIGS. 10A to 10D are diagrams illustrating one example to describe an operation of a mobile terminal in response to a display mode of a touchscreen;

FIG. 12A and FIG. 12B are diagrams illustrating one example of a process for changing a normal document into a panorama document based on a user's touch input;

FIGS. 18A to 18C are diagrams to describe a process for decreasing a horizontal length of a panorama document automatically;

FIG. 19 is a diagram illustrating one example of a process for displaying a document list;

FIG. 20A and FIG. 20B are diagrams illustrating one example to describe an operation when a mobile terminal is connected to an external display device;

FIGS. 23A to 23C are diagrams illustrating one example to describe an operation of a mobile terminal when an inclination of the mobile terminal is detected;

FIG. 24 includes diagrams illustrating one example to describe a secret message.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like. However, the present invention is applicable to such a fixed terminal as a digital TV, a desktop computer and the like as well as a mobile terminal.

Figure 1:
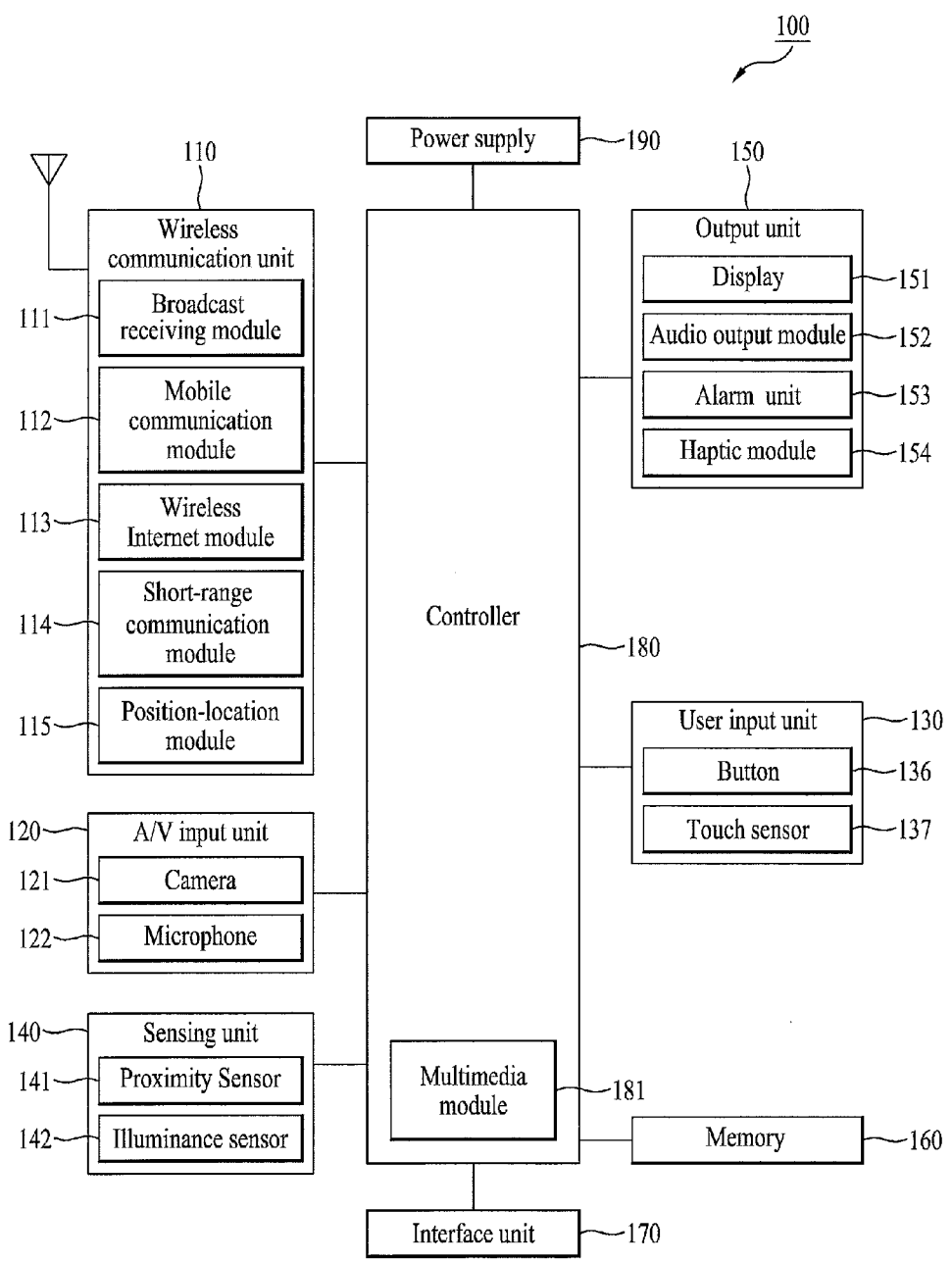
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. Further, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite.

Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Further, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated while receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like (not shown in the drawing).

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. Further, the sensing unit 140 can include a proximity sensor 141 and illumination sensor 142.

The output unit 150 generates outputs relevant to the senses of sight, hearing, touch and the like. Further, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor 137 configures a mutual layer structure (hereinafter called 'touch screen'), it can use the display 151 as an input device as well as an output device. In this instance, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 2:
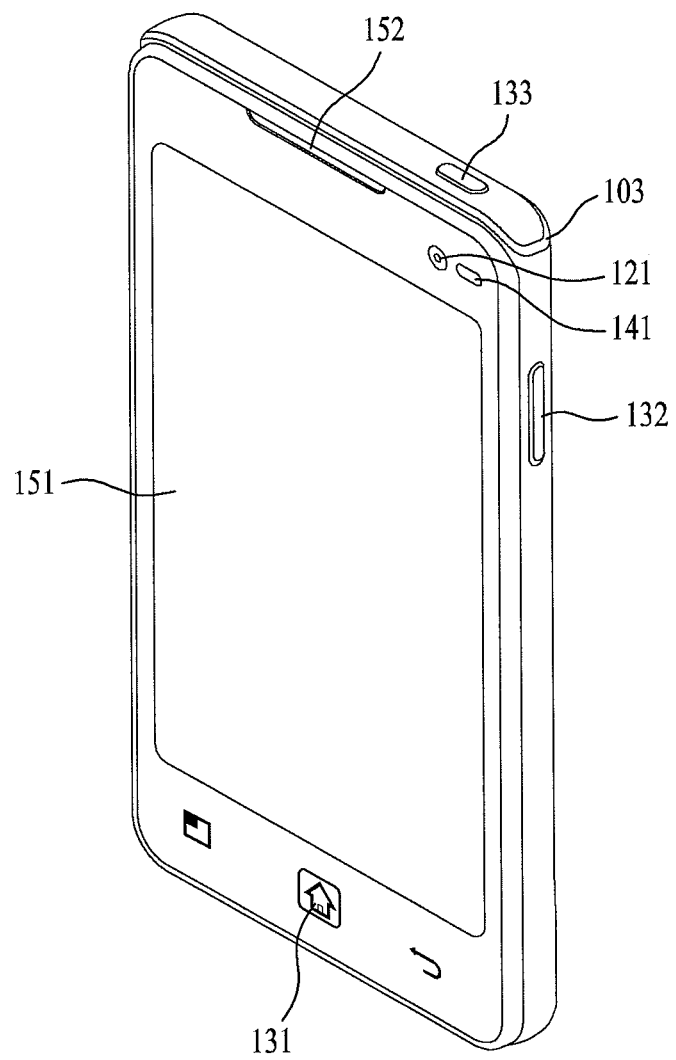
FIG. 2 is a front perspective diagram of a mobile terminal according to one embodiment of the present invention.

Referring to FIG. 2, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). Further, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. Further, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. Further, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Figure 3:
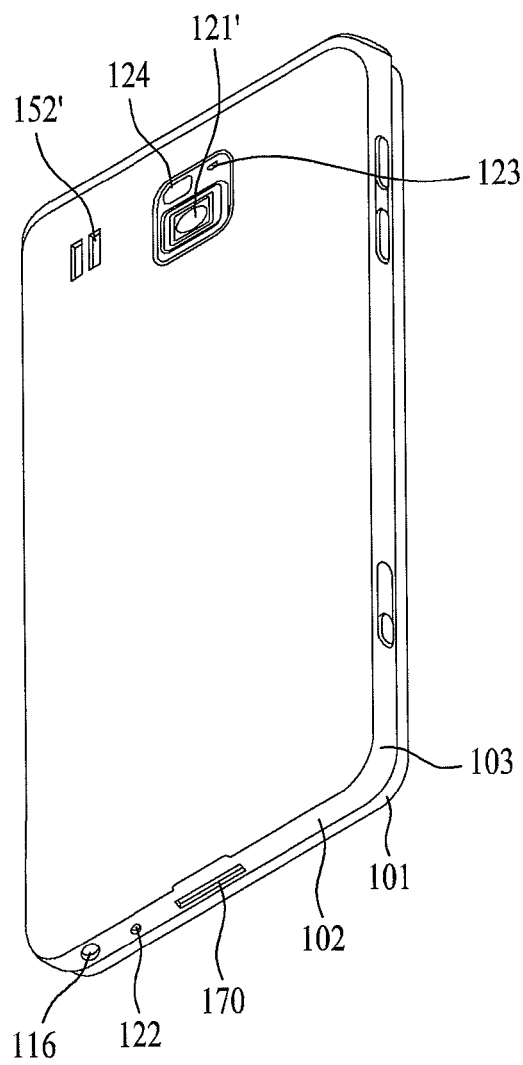
FIG. 3 is a rear perspective diagram of a mobile terminal according to one embodiment of the present invention.

Referring to FIGS. 2 and 3, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. Further, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. Further, a command for a volume adjustment of sound output from the audio output unit 152 and the like can be input to the second manipulating unit 132, a command for a switching to a touch recognizing mode of the display 151 and the like can be input to the second manipulating unit 133.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

In the following description, embodiments relating to a controlling method implemented in the above-configured mobile terminal shall be explained with reference to the accompanying drawings.

For clarity and convenience of the following description, assume that a mobile terminal 100 mentioned in the following description of the present invention includes at least one of the components shown in FIG. 1. In particular, assume that a mobile terminal 100 according to an embodiment of the present invention includes the memory 160 configured to store data, the display unit 151 configured to display a document list saved in the memory 160, the display unit 151 configured to display a document selected from the document list, and the controller 180, if the document selected from the document list is a panorama document having a size greater than that of the display unit 151, automatically scrolling the panorama document in at least one direction to give an overview of a full content of the panorama document. In some cases, the mobile terminal according to an embodiment of the present invention can be assumed as further including at least one of the wireless communication unit 110 configured to perform a wireless communication, the camera 121 for photographing, the microphone 122 for audio recording and the sensing unit 140 configured to detect inclination of the mobile terminal.

In the mobile terminal according to an embodiment of the present invention, if the display module 151 includes a touchscreen, implementation of the following embodiments may be further facilitated. Therefore, the following description is made on the assumption that the display module 151 includes a touchscreen. Further, a reference number 400 shall refer to the touchscreen 151 in the following description with reference to the accompanying drawings.

A panorama document mentioned in the present specification means a document having a size greater than that of the touchscreen 400. For instance, the panorama document may mean one of: i) a document having a horizontal length greater than a length of a horizontal size of the touchscreen 400; ii) a document having a vertical length greater than a length of a vertical side of the touchscreen 400; and iii) a document having horizontal and vertical lengths greater than lengths of horizontal and vertical sides of the touchscreen 400, respectively. Since a size of a panorama document is greater than that of the touchscreen 400, it is unable to display a full content of the panorama document unless the panorama document is reduced in size.

Moreover, unlike the panorama document, since horizontal and vertical lengths of a normal document mentioned in the present specification are equal to or smaller than lengths of horizontal and vertical sides of the mobile terminal, respectively, the normal document may mean a document of which full content can be displayed on the touchscreen 400 without being reduced.

Prior to describing a mobile terminal according to an embodiment of the present invention, a panorama document shall be described in detail. For clarity of the following description, a document, of which horizontal length is greater than that of a horizontal side of the touchscreen 400, shall be taken for example of the panorama document. Moreover, when illustrating panorama documents in the accompanying drawings, an outline of a region output through the touchscreen 400 is denoted by a solid line, while a boundary of a region not output through the touchscreen 400 shall be denoted by a dotted line.

Creation of a panorama document is described in detail with reference to FIG. 4 as follows. FIG. 4 is a diagram illustrating one example to describe that a panorama document is created.

Referring to FIG. 4, if a document creating application for creating or editing a normal document or a panorama document is activated, the controller 180 can display a document list of documents saved in the memory 160. Further, the controller 180 can display a new document creating button 402/404 for creating a new document together with the document list saved in the memory 160.

In FIG. 4, the new document creating buttons include a button 'New note' 402 and a button 'Panorama note' 404 for example. The new note button 402 may be provided to newly create a normal document and the panorama note button 404 may be provided to create a panorama document. In the example shown in FIG. 4, if a touch input to the new note button 402 is detected, the controller 180 can newly create a normal document. If a touch input to the panorama note button 404 is detected, the controller 180 can newly create a panorama document.

If a normal document or a panorama document is newly created, the controller 180 can enter an editing mode for editing the newly created document. Based on a user input, the controller 180 can control a text to be input to the corresponding document or may control a handwritten input to be drawn along a user's touch input trace. Moreover, based on a user input, the controller 180 can control such a multimedia file as an image, a music, a video and the like to be attached to a document. The document editing mode is described in detail with reference to FIG. 5 as follows.

Figure 5B:
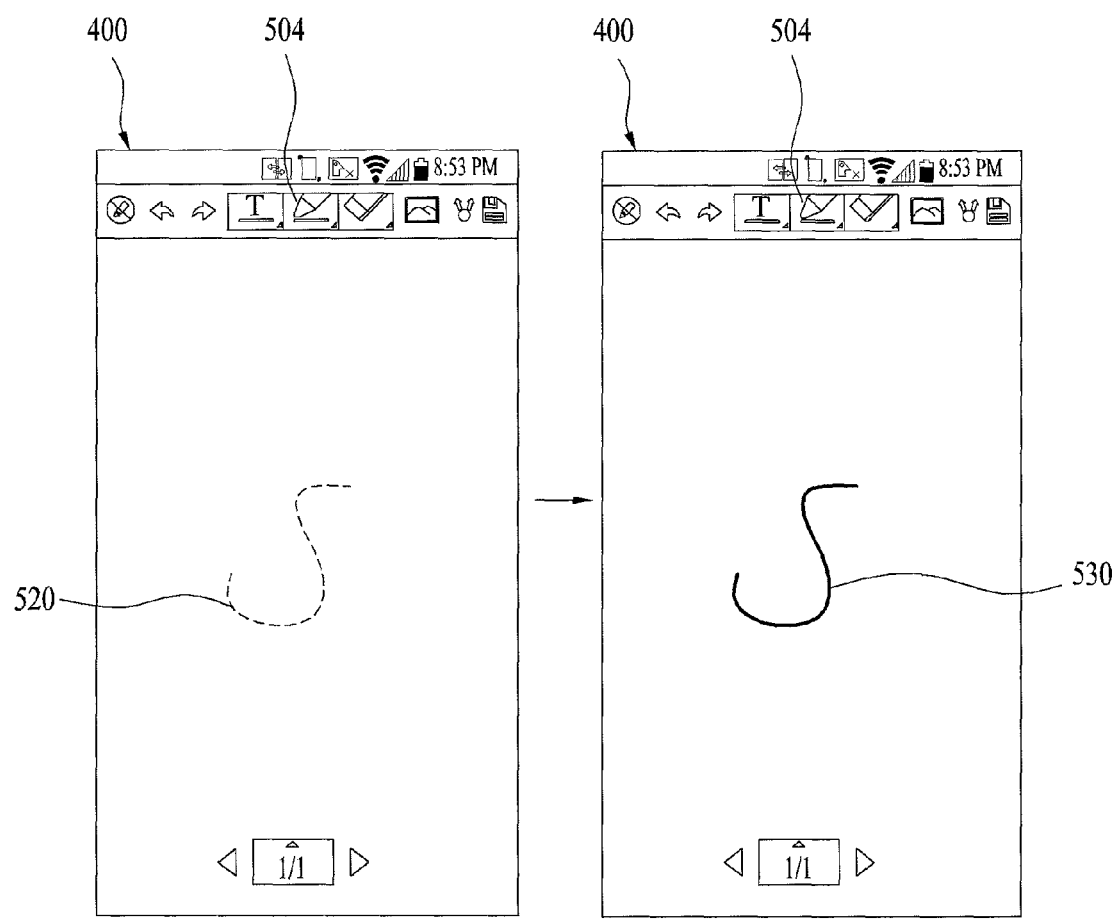

FIGS. 5A to 5C are diagrams illustrating one example to describe an editing mode of a document. Referring to FIGS. 5A to 5C, if a user intends to input a text, the controller 180 can display a virtual keypad 510 on the touchscreen 400 to enable the user to input the text. For instance, if a text input key button 502 is selected, the controller 180 can display the virtual keypad 510 on the touchscreen 400.

The controller 180 can control a handwritten input to be drawn along a trace of a user's touch input. For instance, referring to FIG. 5B, if a user applies a touch input to the touchscreen 400 while the handwritten input button 504 is selected, the controller 180 can control a handwritten input 530 to be drawn along a user's touch input trace 520. In FIG. 5B, because a touch input of the 'S' trace 520 is input, a handwritten input 530 in the shape of 'S' is drawn on the touchscreen 400.

The controller 180 can control a multimedia file selected by a user to be attached to a document. For instance, referring to FIG. 5C, if a file attach button 506 is selected, the controller 180 can display a multimedia file list 540 of multimedia files attachable to the document. In this instance, the multimedia file attachable to the document may include at least one of a music file, an image file and a video file. For instance, in the example shown in FIG. 5C, a photo item 541 and a photographing item 542 are provided to attach image files, a video item 543 and a video shooting item 544 are provided to attach video files, and an audio item 545 and an audio recording item 546 are provided to attach music files.

In particular, among the items shown in FIG. 5C, the photo item 541, the video item 543 and the audio item 545 may be provided to attach an image file, a video file and a music file, which are previously saved in the memory 160, to a document, respectively. After an image file, a video file and a music file have been newly created, the photographing item 542, the video shooting item 544 and the audio recording item 546 may be provided to attach the newly created image file, the newly created video file and the newly created music file to a document, respectively.

For instance, in the example shown in FIG. 5C, if the photographing item 542 is touched, the controller 180 can control the camera 121 to be activated to enable a user to take a picture. In another instance, in the example shown in FIG. 5C, if the video shooting item 544 is touched, the controller 180 can control the camera 121 to be activated to enable a user to record a video footage. After the photographing or the video recording has been completed, the controller 180 can control the taken picture or the recorded video footage to be automatically attached to a document.

The mobile terminal according to an embodiment of the present invention discriminates a normal document and a panorama document from each other. When attempting to attach a taken photo to the normal document, the mobile terminal can control a photographing mode of the camera 121 to be set to a normal photographing mode. When attempting to attach a taken photo to a panorama document, the mobile terminal can control a photographing mode of the camera 121 to be automatically set to a panorama photographing mode. Moreover, the controller 180 can control a horizontal length of a panorama photo taken in the panorama photographing mode to be limited to a horizontal length of the panorama document. Further, the controller 180 can control the horizontal length of the panorama document to be adjusted depending on the horizontal length of the panorama photo.

In the example shown in FIG. 5C, if the audio recording item 546 is touched, the controller 180 can control the microphone 122 to be activated to record a user's voice. After the audio recording has been completed, the controller 180 can control the recorded audio file (e.g., a voice file, a music file, etc.) to be automatically attached to a document.

A sticker, a date information, a location information, a user's schedule information and the like may be attached to a document as well as a multimedia file such as an image file, a video file, a music file and the like. Because a size of a panorama document is greater than that of the touchscreen 400 unlike a normal document, a full content of the panorama document is not displayed on the touchscreen 400. Hence, in order to display a region not displayed on a screen, the controller 180 can control the panorama document to be scrolled in right and left directions based on a user input. A method of scrolling a panorama document in right and left directions is described in detail with reference to FIGS. 6 to 8 as follows.

Figure 6A:
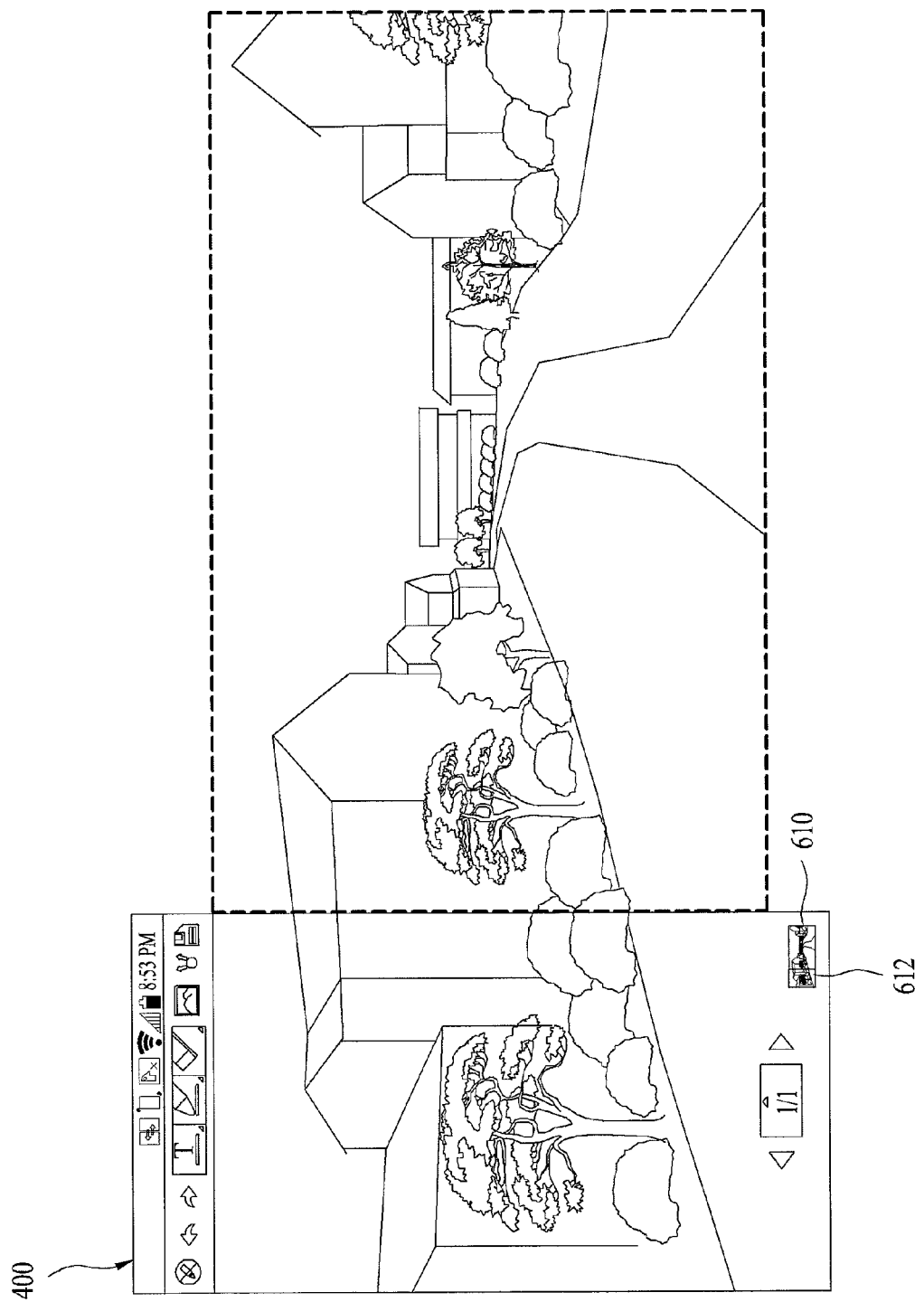
Figure 6C:
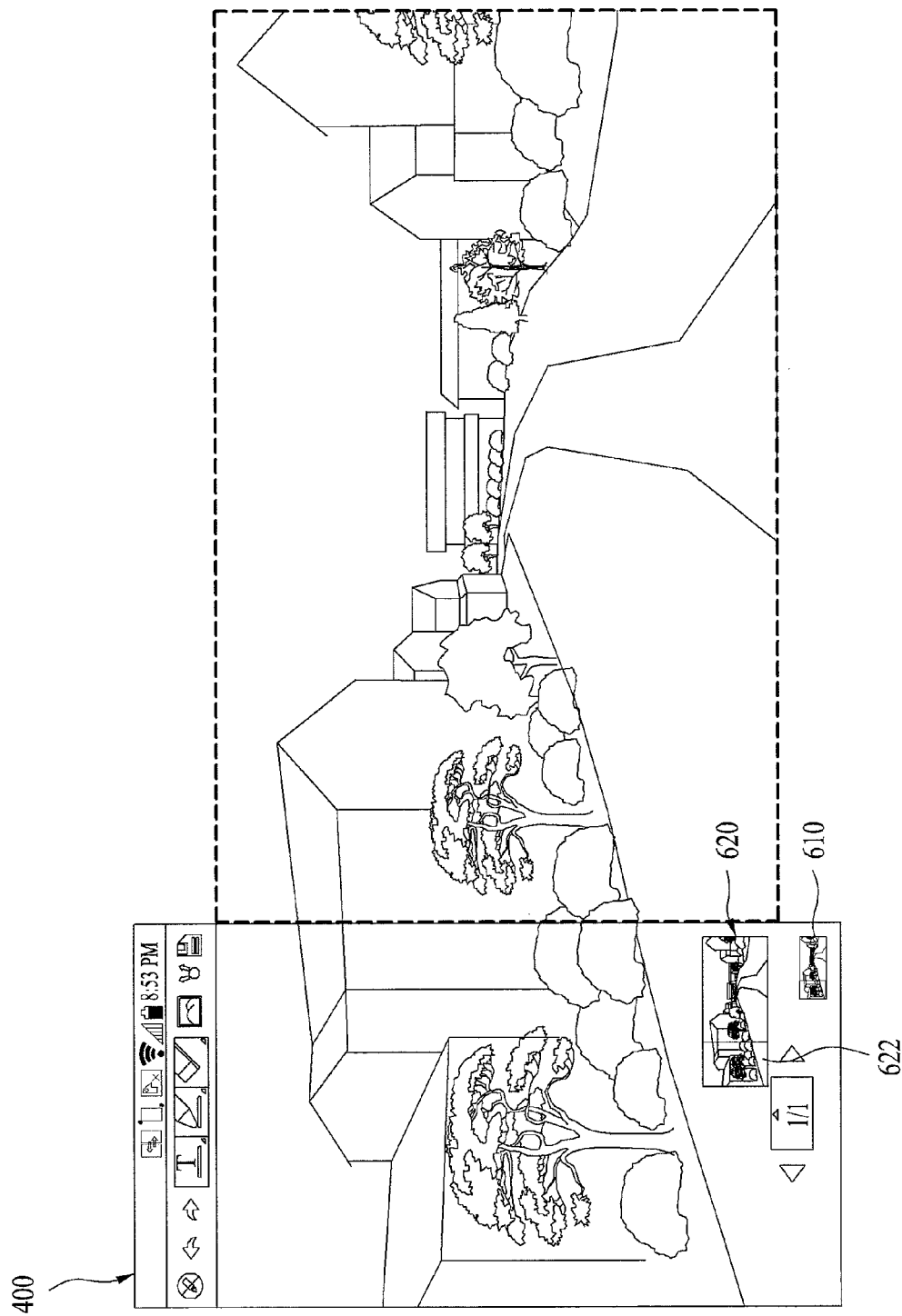

Next, FIGS. 6A to 6C are diagrams illustrating one example to describe a process for scrolling a panorama document using a mini-map. Referring to FIGS. 6A to 6C, while a panorama document in a size greater than that of the touchscreen 400 is being edited, the controller 180 can display a mini-map 610 of the panorama document.

For a right-left scroll of the panorama document, the controller 180 can display the mini-map 610 of the panorama document on the touchscreen 400. In this instance, the mini-map 610 represents a full content of the panorama document as a preview image. Further, a frame 612 may be displayed on the mini-map 610 to guide a region currently output through the touchscreen 400. When a user shifts the frame 612 of the mini-map 610 in a left or right direction, the controller 180 can control the panorama document to be scrolled in the right and left directions in response to the shift of the frame 612. For instance, referring to FIG. 6A and FIG. 6B, if the frame 612 of the mini-map 610 is shifted in the right direction, the controller 180 can control the panorama document to be scrolled in the right direction as well in response to the shift of the frame 612 in the mini-map 610.

For a precise scroll of a panorama document, the mobile terminal according to an embodiment of the present invention can display an extended mini-map 620, which results from extending the mini-map 610. For instance, if the mini-map 610 shown in FIG. 6A is touched, referring to FIG. 6C, the controller 180 can display the extended mini-map 620 extended from the mini-map 610. Hence, a user adjusts a location of an extended frame 622 in the extended mini-map 620, thereby scrolling the panorama document more precisely.

A mobile terminal according to another embodiment of the present invention can control a panorama document to be scrolled based on a touch input to the touchscreen 400. For instance, the controller 180 discriminates a touch input using a single pointer and a touch input using two pointers from each other and can then recognize the touch input using the single pointer as an input for editing the panorama document and the touch input using the two pointers as an input for the right-left scroll of the panorama document. A process for scrolling a panorama document based on a touch input using two pointers is described in detail with reference to FIG. 7 and FIG. 8 as follows.

Figure 7B:
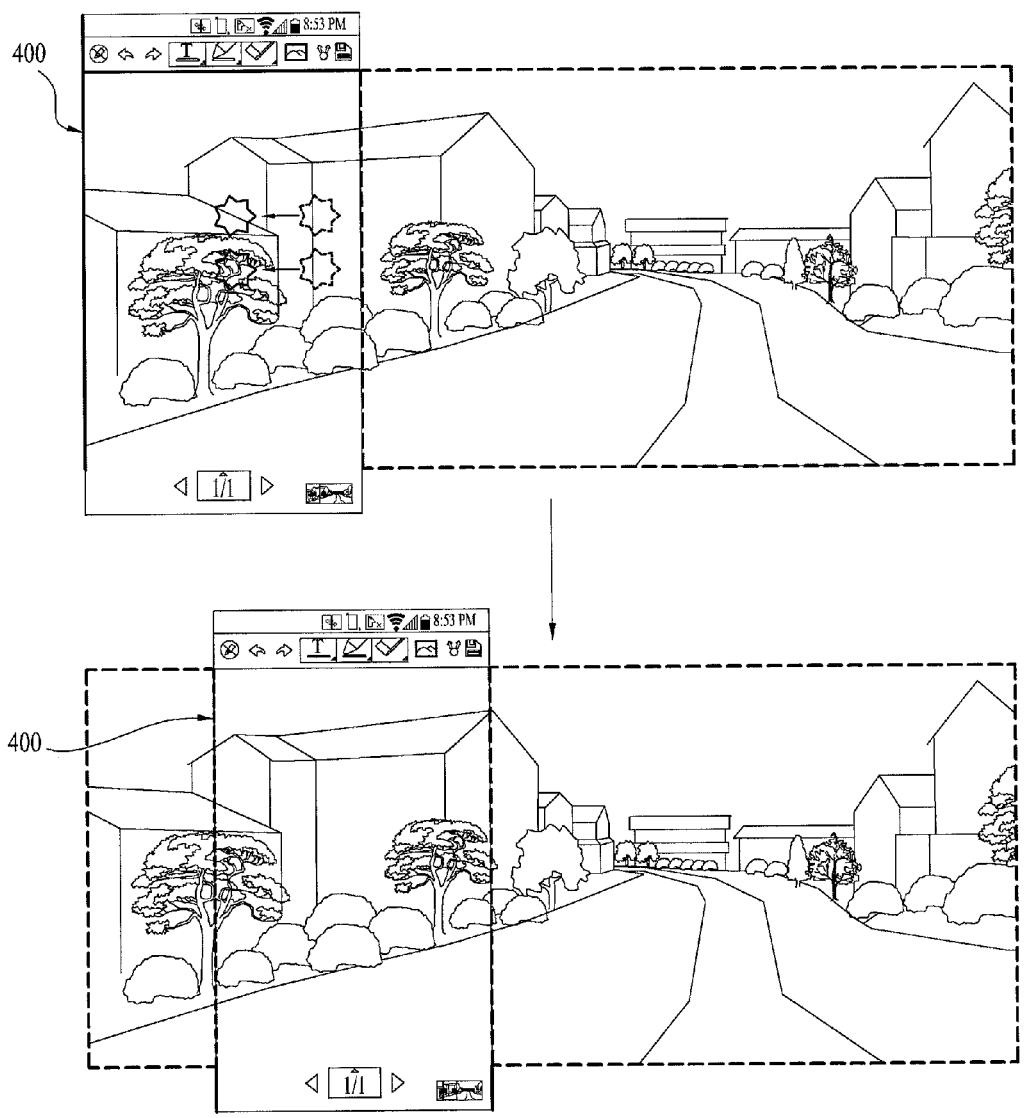
Figure 8A:
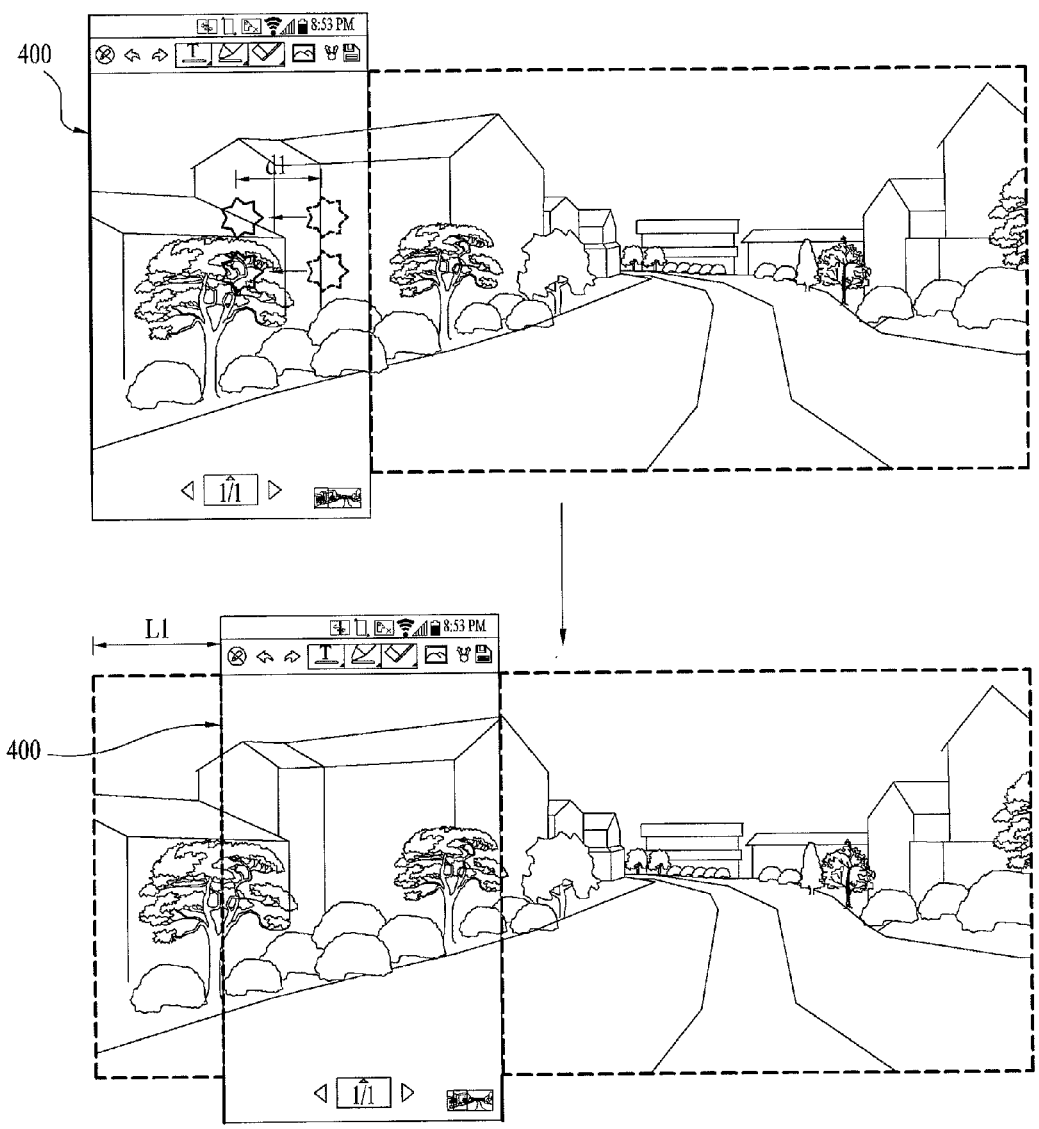
FIGS. 8A to 8C are diagrams illustrating another example to describe a process for scrolling a panorama document in right/left direction in response to a user's touch input.
Figure 8B:
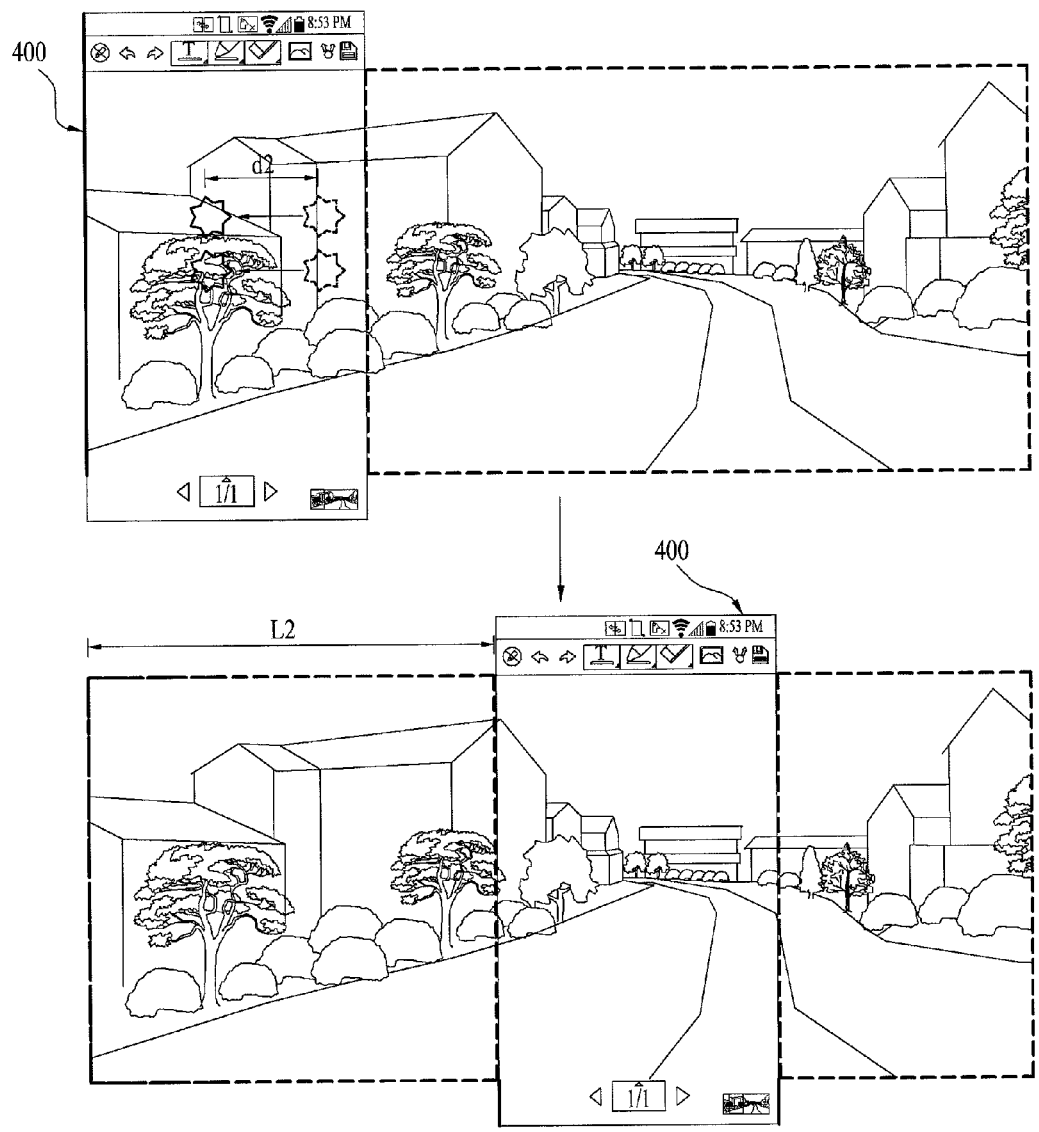
Figure 8C:
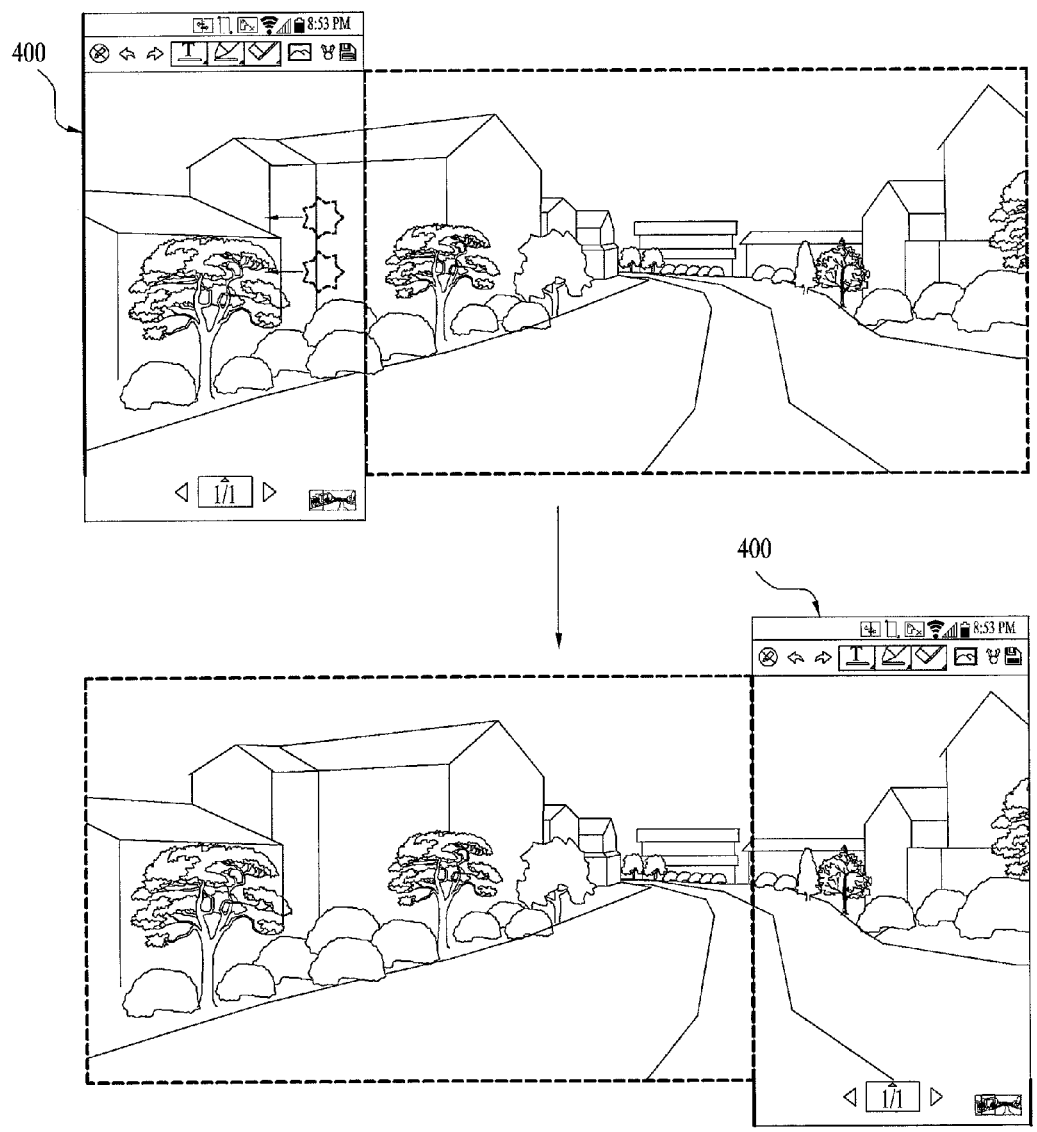

FIGS. 7A to 7C are diagrams illustrating one example to describe a process for scrolling a panorama document in right/left direction in response to a user's touch input. Further, FIGS. 8A to 8C are diagrams illustrating another example to describe a process for scrolling a panorama document in right/left direction in response to a user's touch input.

Referring to FIG. 7A, after an editing mode of a panorama document has been entered, if a touch input is applied using two pointers, the controller 180 can display a GUI (graphic user interface) cue 710 to indicate that the panorama document can be scrolled. Through the GUI cue 710, a user can recognize that the panorama document can be scrolled in the right and left directions if using two pointers.

Subsequently, after the user has touched the touchscreen with two pointers substantially at the same time, if the user moves the pointers, the controller 180 can scroll the panorama document in response to the motion of the pointers. In doing so, the moving direction of the pointers and the scroll direction of the panorama document may be set opposite to each other. For instance, referring to FIG. 7B, if the two pointers move to the left side from the right side, the controller 180 can display a right region of the panorama document by scrolling the panorama document to the right side. On the contrary, referring to FIG. 7C, if the two pointers move to the right side from the left side, the controller 180 can display a left region of the panorama document by scrolling the panorama document to the left side.

In the above-described example, the touch input for scrolling the panorama document may include at least one of a drag input and a flicking input. The mobile terminal according to an embodiment of the present invention discriminates dragging two points and flicking with two pointers from each other, thereby controlling a scroll level of the panorama document. This is described in detail with reference to FIGS. 8A to 8C as follows.

FIGS. 8A to 8C are diagrams illustrating another example to describe a process for scrolling a panorama document in right/left direction in response to a user's touch input. Referring to FIGS. 8A to 8C, if two pointers coming in contact with the touchscreen 400 are dragged in one direction, the controller 180 can adjust a scroll level of a panorama document in proportion to a moving distance of the two pointers. For instance, referring to FIG. 8A, when the moving distance of the two pointers is d1, if a scroll length of the panorama document is L1. Referring to FIG. 8B, if a moving distance of the two pointers is d2 greater than d1, a scroll length of the panorama document may be L2 greater than L1.

When the moving distance of the two pointers is controlled to be scrolled to the right side by the length L1, if the two pointers are shifted to the left side by the length d2 greater than d1, referring to FIG. 8B, the controller 180 can control the panorama document to be scrolled to the right side by the length L2 greater than L1 in response to the drag input. In particular, like the examples shown in FIG. 8A and FIG. 8B, the controller 180 can determine the scroll length of the panorama document in response to the moving distance of the two pointers in contact with the touchscreen 400.

If the two pointers in contact with the touchscreen 400 are dragged in one direction, the controller 180 can control the panorama document to be scrolled to a left or right end of the panorama document irrespective of the moving distance of the two pointers. For instance, referring to FIG. 8C, if a flicking input with two pointers is applied in left direction, the controller 180 can control the panorama document to be scrolled to the right end in response to the flicking input.

FIG. 7 and FIG. 8 shows the examples of using two pointers in scrolling a panorama document for clarity of the description, by which the present invention is non-limited. Further, more or less pointers are usable in scrolling the panorama document.

If intending to look into a full content of a panorama document, as shown in FIGS. 6 to 8, a user can scroll the panorama document in right and left directions. Yet, even if the panorama document is scrolled in right and left directions, a part output through the touchscreen 400 is a portion of the panorama document. Hence, it is difficult for the user to recognize the full content of the panorama document in one glance. Therefore, the controller 180 can display a thumbnail indicating the full content of the panorama document on the touchscreen 400. A process for displaying a thumbnail of a panorama document on the touchscreen 400 is described in detail with reference to FIG. 9 as follows.

Figure 9B:
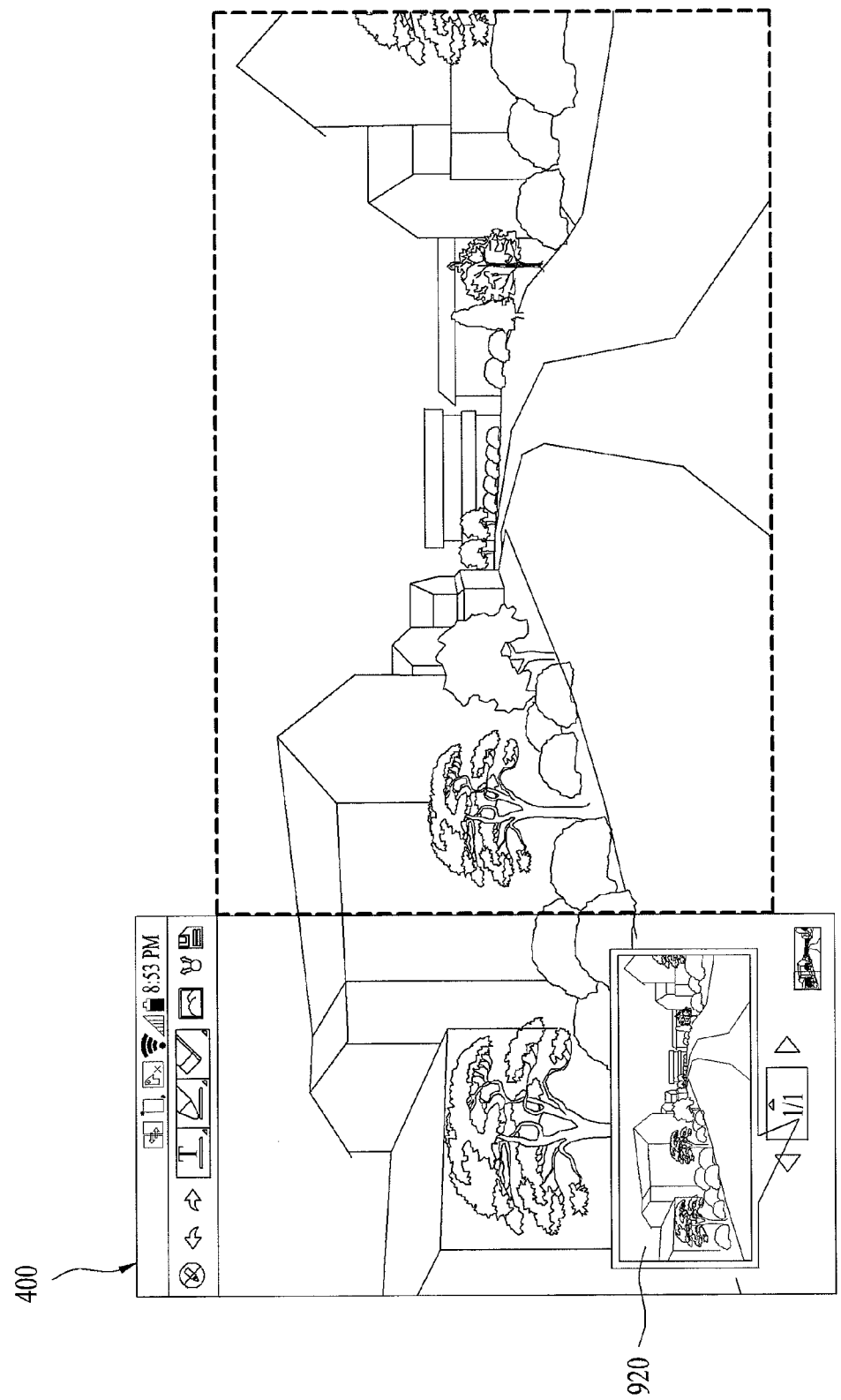

FIG. 9A and FIG. 9B are diagrams illustrating one example to describe a process for displaying a thumbnail of a panorama document on a touchscreen. Referring to FIG. 9A and FIG. 9B, the controller 180 can display a thumbnail of a panorama document on the touchscreen 400 in response to a user's touch input. For instance, if a page indicator 910 indicating the current and total page numbers of the panorama document is touched (FIG. 9A), the controller 180 can display a thumbnail 920 indicating a full content of the panorama document (FIG. 9B).

The mobile terminal according to one embodiment of the present invention can display a full content of a panorama document if a mode of the touchscreen 400 is set to a landscape mode. In particular, the controller 180 discriminates when the touchscreen 400 is in portrait mode from when the touchscreen 400 is in landscape mode. If the touchscreen 400 is in the portrait mode, the controller 180 displays a partial region of the panorama document. If the touchscreen 400 is in the landscape mode, the controller 180 reduces the panorama document and is then display the full content of the panorama document. This is described in detail with reference to FIG. 10 as follows.

Figure 10A:
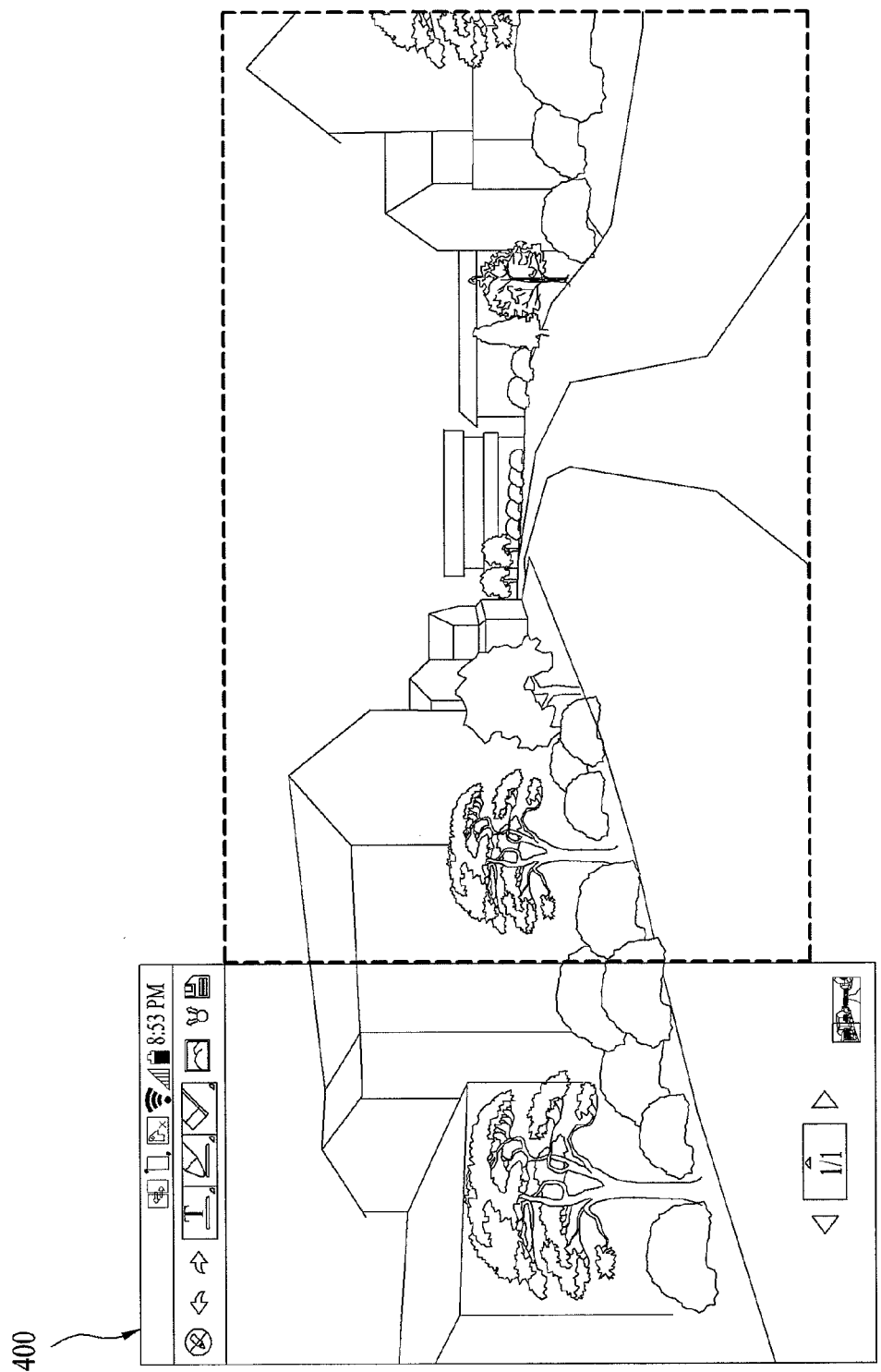
Figure 10B:
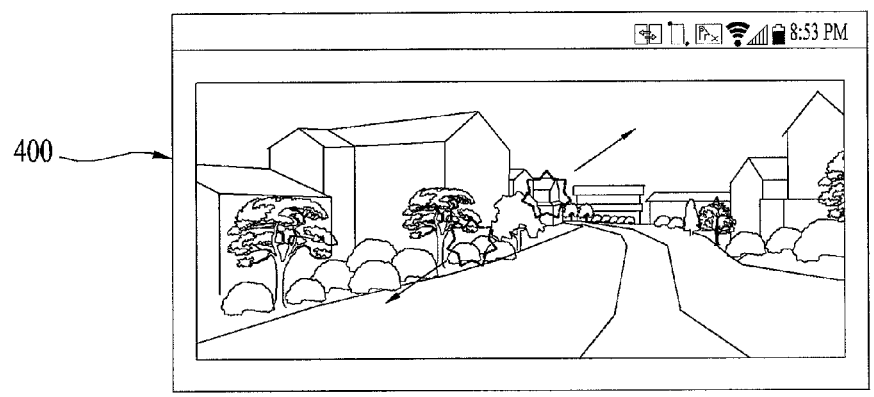

FIGS. 10A to 10D are diagrams illustrating one example to describe an operation of a mobile terminal in response to a display mode of a touchscreen. Referring to FIG. 10A, if a mode of the touchscreen 400 is set to a portrait mode, the controller 180 can display a portion of a panorama document on the touchscreen 400. As the mobile terminal inclines in a horizontal direction, if the touchscreen 400 enters a landscape mode, referring to FIG. 10B, the controller 180 reduces the panorama document and can then display a full content of the panorama document on the touchscreen 400. Like the examples shown in FIG. 10A and FIG. 10B, the controller 180 can determine whether to display the full content of the panorama document or the portion of the panorama document depending on whether the mode of the touchscreen 400 is set to the landscape mode or the portrait mode.

The mobile terminal according to an embodiment of the present invention can adjust an editing authority of a panorama document depending on a display mode of the touchscreen 400. For instance, referring to FIG. 10A, as the display mode of the touchscreen 400 is set to the portrait mode, if a portion of the panorama document is displayed through the touchscreen 400, the controller 180 can enter an editing mode in which an editing authority for editing the panorama document is activated. On the other hand, referring to FIG. 10B, as the display mode of the touchscreen 400 is set to the landscape mode, if the whole panorama document is displayed through the touchscreen 400, the controller 180 can enter a read-only mode in which the panorama document cannot be edited due to the deactivated editing authority for editing the panorama document. In this instance, the read-only mode may mean a state in which the content of the panorama document is appreciated only due to the absence of the editing authority for editing the panorama document.

Figure 10C:
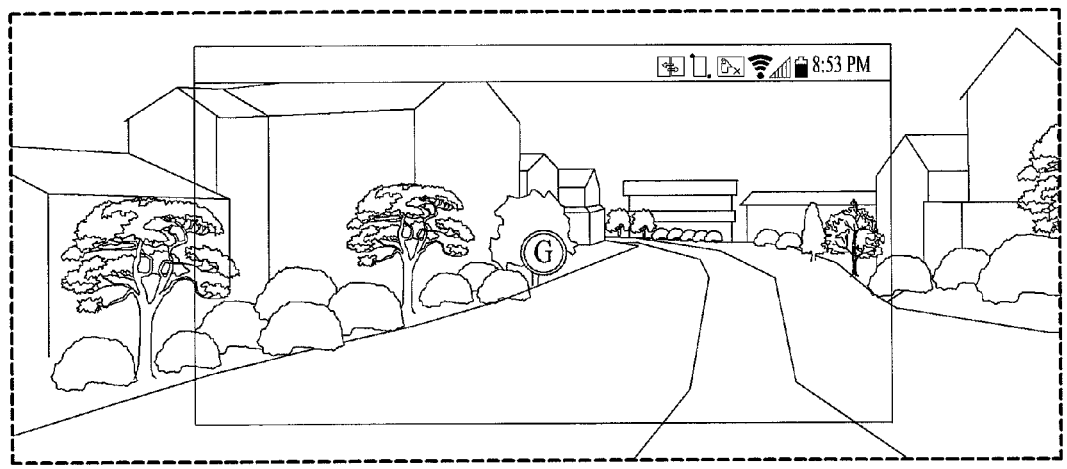

In the read-only mode, the controller 180 can enlarge or reduce the panorama document in response to a user input. For instance, if a touch input is applied by touching the touchscreen 400 with two pointers substantially at the same time and then spacing the two pointers apart from each other by maintaining the touch (FIG. 10B), the controller 180 can control the panorama document to be enlarged (FIG. 10C). While the panorama document is enlarged, if the display mode of the touchscreen 400 is switched to the portrait mode, the controller 180 can control a current page to be rotated centering on the enlarged location viewed in the landscape mode (FIG. 10D). For instance, if a center point G of an enlarged screen in the landscape mode is 'G' (FIG. 10C), the center point G can be located on a virtual line 1010 that divides the touchscreen 400 into a left part and a right part (FIG. 10D).

The mobile terminal according to an embodiment of the present invention extends a size of a normal document and can then change the normal document into a panorama document. The mobile terminal decreases a size of a panorama document and can then change the panorama document into a normal document. A process for changing a normal document into a panorama document is described in detail with reference to FIGS. 11 to 13 as follows.

Figure 11:
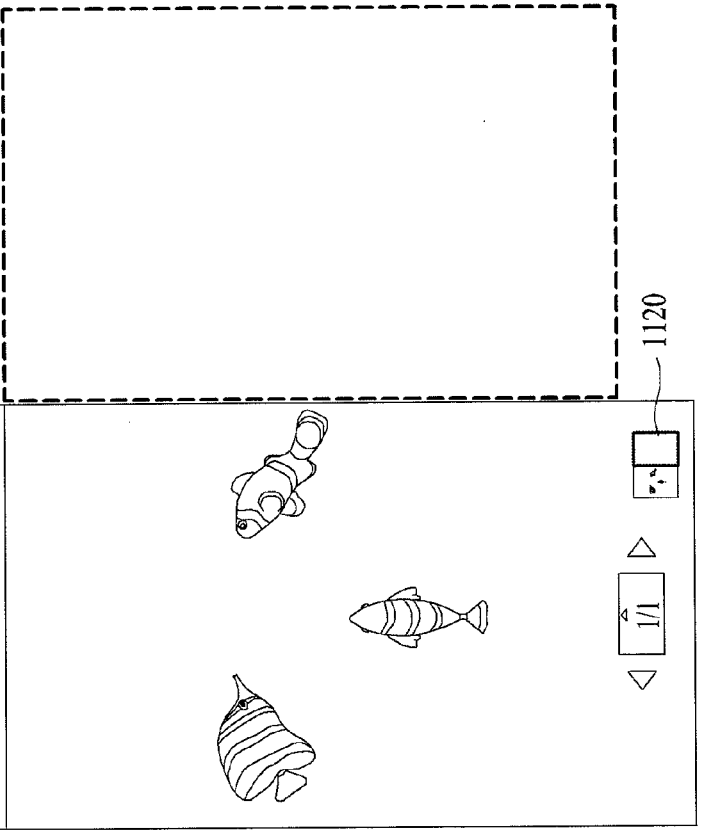
FIG. 11 is a diagram to describe a process for changing a normal document into a panorama document.

FIG. 11 is a diagram to describe a process for changing a normal document into a panorama document. Referring to FIG. 11, the controller 180 increases a size of a normal document based on a user input and can then change the normal document into a panorama document. For instance, if an item 'change into a panorama document' is selected from an overflow menu 1110 shown in FIG. 11(*a*), referring to FIG. 11(*b*), the controller 180 can change the normal document into the panorama document by extending a horizontal length of the normal document. When changing the normal document into the panorama document, the controller 180 can control the horizontal length of the normal document to be extended by a predetermined length. Alternatively, the controller 180 can control the horizontal length to be extended by a length set by a user. However, it is not necessary for a horizontal length of a panorama note to be fixed. Instead, the horizontal length of the panorama note can be arbitrarily varied in response to a user input. When a normal document of a panorama note is changed into a panorama document, a mini-map of the panorama document can be displayed on the touchscreen 400.

The mobile terminal according to one embodiment of the present invention can change a normal document into a panorama document in response to a user's touch input. For instance, the controller 180 discriminates a touch input using a single pointer and a touch input using two pointers from each other, recognizes the touch input using the single pointer as an input for editing a normal document, and recognizes the touch input using the two pointers as an input for extending a horizontal length of the normal document. A process for changing a normal document into a panorama document in response to a touch input using two pointers is described in detail with reference to FIG. 12 as follows.

FIG. 12A and FIG. 12B are diagrams illustrating one example of a process for changing a normal document into a panorama document based on a user's touch input. Referring to FIG. 12A and FIG. 12B, if receiving a drag input from two pointers in contact with the touchscreen 400 while editing a normal document, the controller 180 can change the normal document into a panorama document by extending a horizontal length of the normal document. In doing so, the controller 180 can determine an extended horizontal length of the normal document in proportion to a moving distance of the two pointers.

For instance, referring to FIG. 12A, when the moving distance of the two pointers is d1, a horizontal length of the normal document is extended by L1. Referring to FIG. 12B, when the moving distance of the two pointers is d2 greater than d1, the horizontal length of the normal document can be extended by L2 greater than L1.

As the horizontal length of the normal document is extended, if the normal document is changed into the panorama document, as mentioned in the foregoing description with reference to FIG. 11, a mini-map of the panorama document can be displayed on the touchscreen 400.

The mobile terminal according to one embodiment of the present invention can change a normal document into a panorama document while a document list is displayed. This is described in detail with reference to FIG. 13 as follows.

Figure 13:
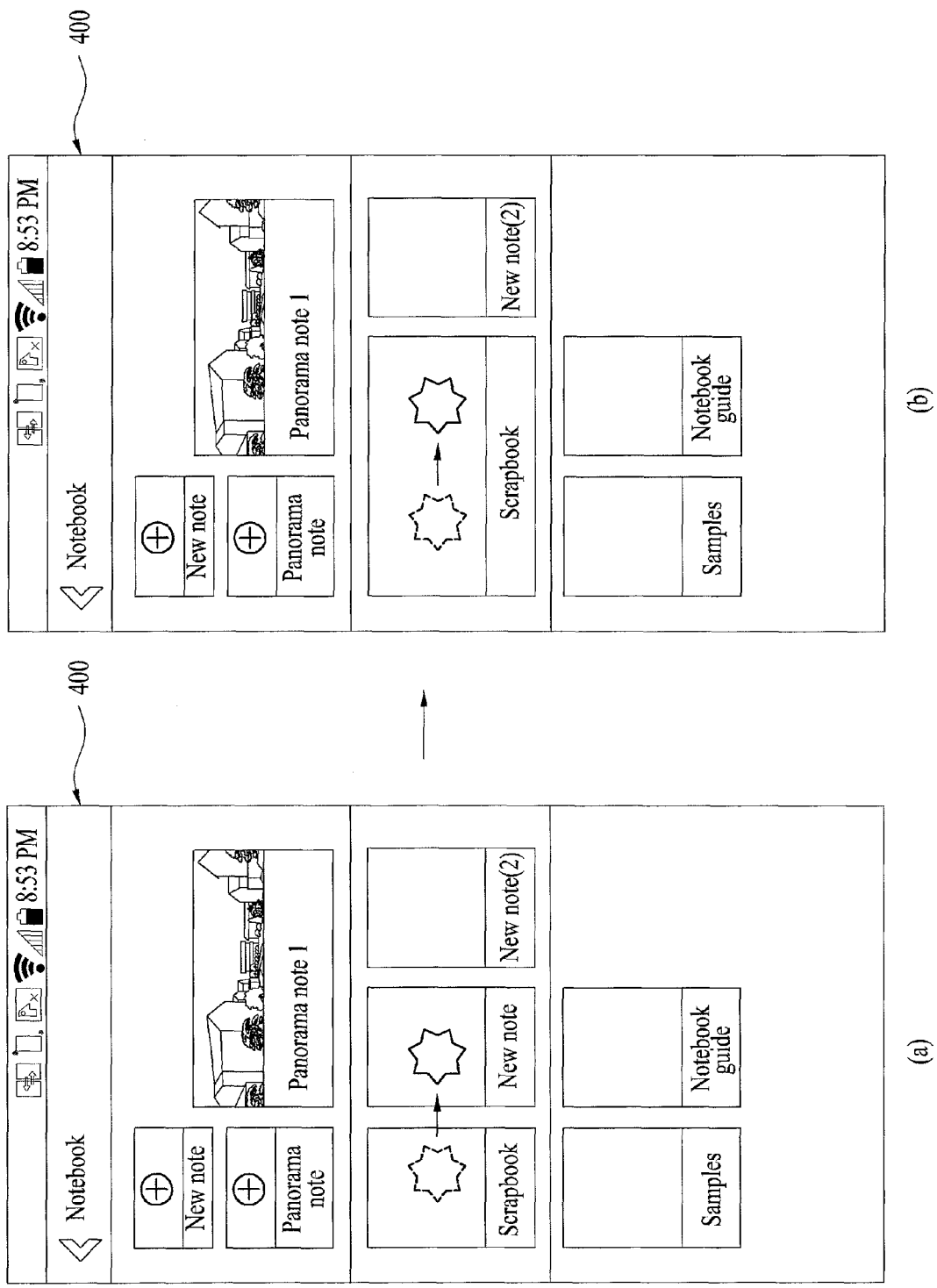
FIG. 13 is a diagram illustrating one example of a process for changing a normal document into a panorama document while displaying a document list.

FIG. 13 is a diagram illustrating one example of a process for changing a normal document into a panorama document while displaying a document list. Referring to FIG. 13, while a document list is displayed, if receiving a touch input of dragging a random document classified as a normal document to another document (FIG. 13(*a*)), the controller 180 can control a single panorama note to be configured by merging two documents selected by the touch input together (FIG. 13(*b*)).

On the other hand, while the document list is displayed, if receiving a touch input of dragging a random document classified as a normal document to the right or left, the controller 180 can control the normal document to be changed into a panorama document without document mergence.

By changing a normal document into a panorama document based on a touch input applied while displaying a document list, a user can change the normal document into the panorama document conveniently and easily.

In the following description, a process for changing a panorama document into a normal document is explained in detail with reference to FIGS. 14 to 17.

Figure 14A:
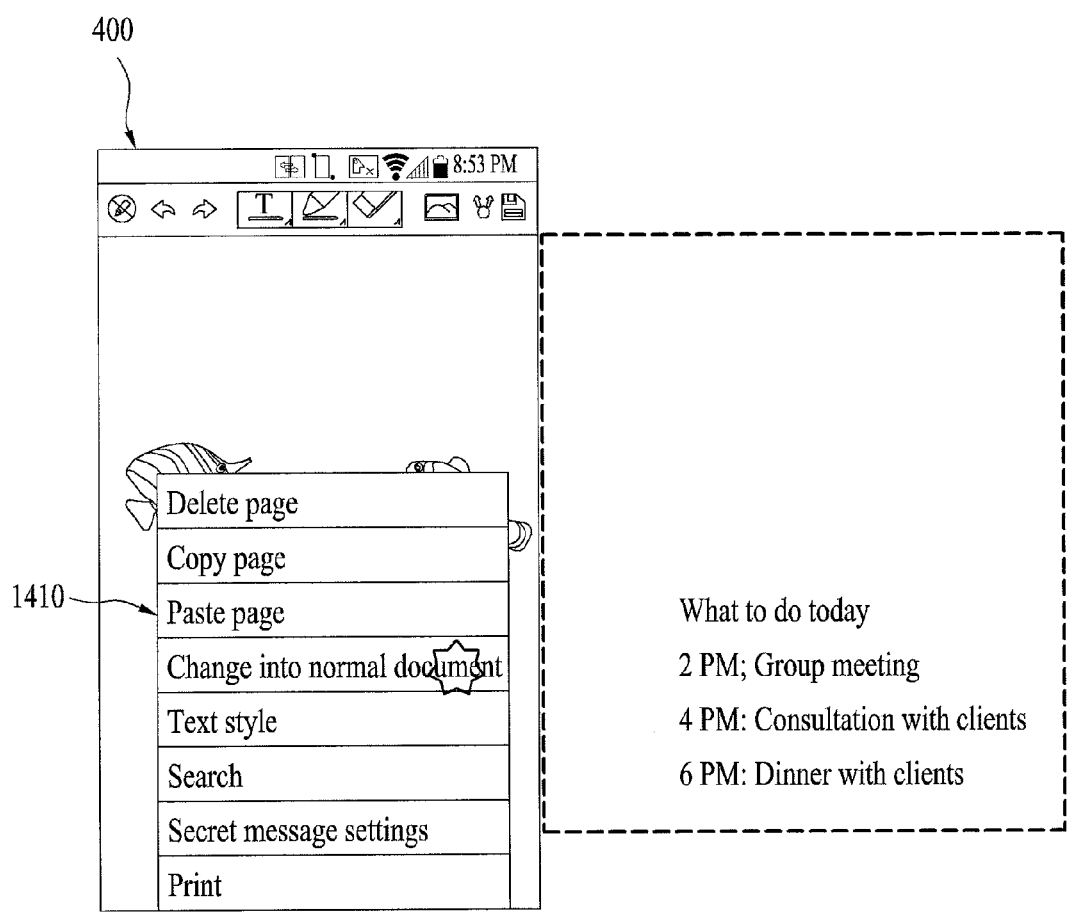
FIGS. 14A to 14C are diagrams illustrating one example to describe a process for changing a panorama document into a normal document.
Figure 14B:
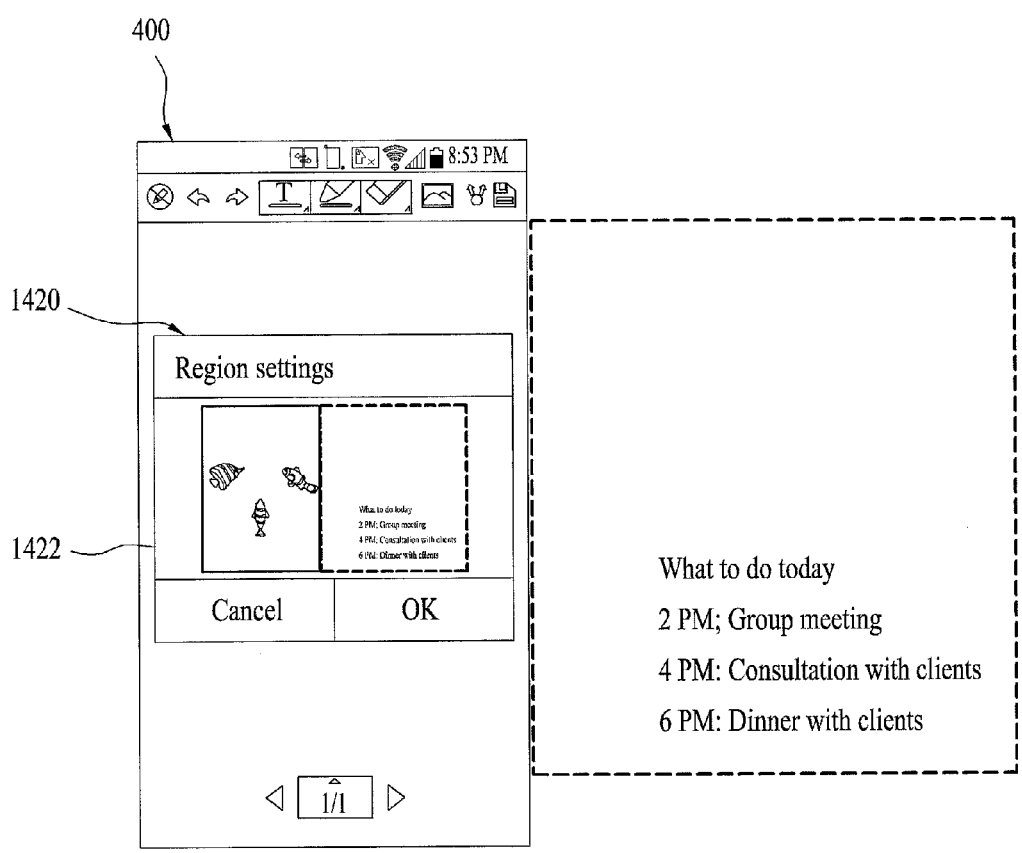
Figure 14C:
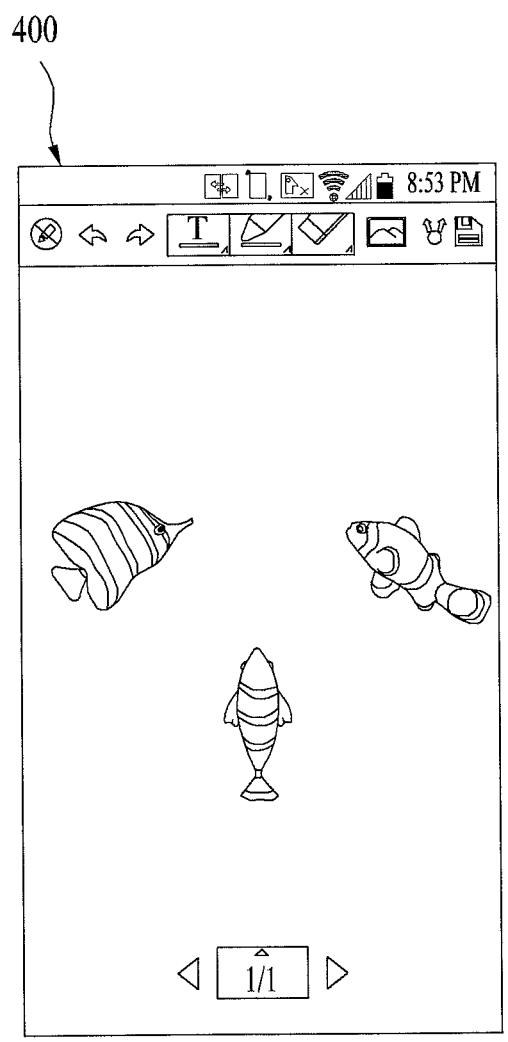

FIGS. 14A to 14C are diagrams illustrating one example to describe a process for changing a panorama document into a normal document. Referring to FIGS. 14A to 14C, the controller 180 can change a panorama document into a normal document by decreasing a horizontal length of the panorama document into a length equal to or smaller than that of a horizontal side of the touchscreen 400. For instance, if an item 'change into a normal document' is selected from an overflow menu 1410 shown in FIG. 14A, referring to FIG. 14C, the controller 180 can change the panorama document into the normal document by decreasing the horizontal length of the panorama document into a length equal to or smaller than that of the horizontal side of the touchscreen 400.

Prior to decreasing the horizontal length of the panorama document, referring to FIG. 14B, the controller 180 can display a remaining region setting menu 1420 to set a remaining region in the panorama document. In this instance, a preview of the panorama document and a frame 1422 may be included in the remaining region setting menu 1420 (FIG. 14B). In particular, the frame 1422 indicates a region remaining without being deleted on changing the panorama document into the normal document. Further, a user can set the remaining region by shifting the frame 1422 in the remaining region setting menu 1420. If the user sets the remaining region, the controller 180 can control the panorama document to be changed into the normal document by deleting the rest of regions except the remaining region.

As a partial region of the panorama document is deleted to change the panorama document into the normal document, a content included in the panorama document may be lost. For instance, the normal document shown in FIG. 14C includes an image contained in the remaining region of the panorama document shown in FIG. 14A but does not include a text contained in the rest of the regions except the remaining region.

The mobile terminal according to another embodiment of the present invention may automatically rearrange a content included in a panorama document in order to prevent a loss of the content included in the panorama document. This is described in detail with reference to FIG. 15 as follows.

Figure 15A:
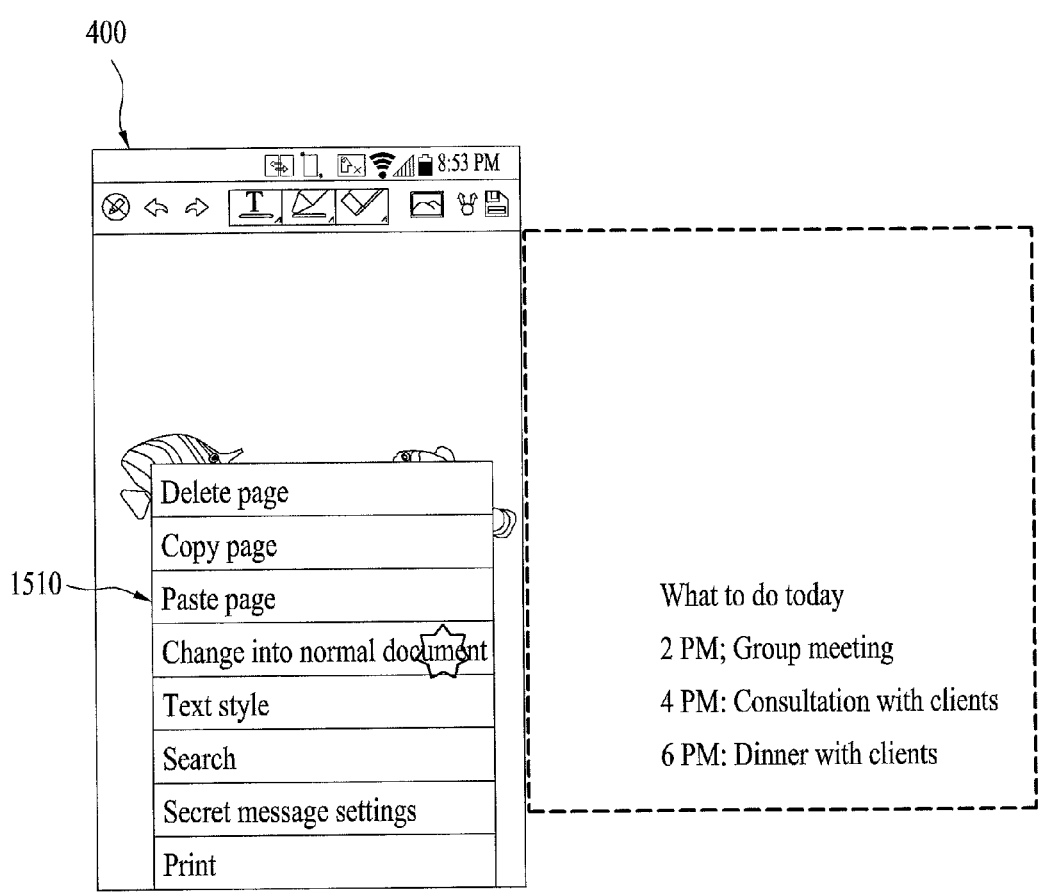
FIGS. 15A to 15C are diagrams to describe a process that a content included in a panorama document is rearranged in a normal document.
Figure 15B:
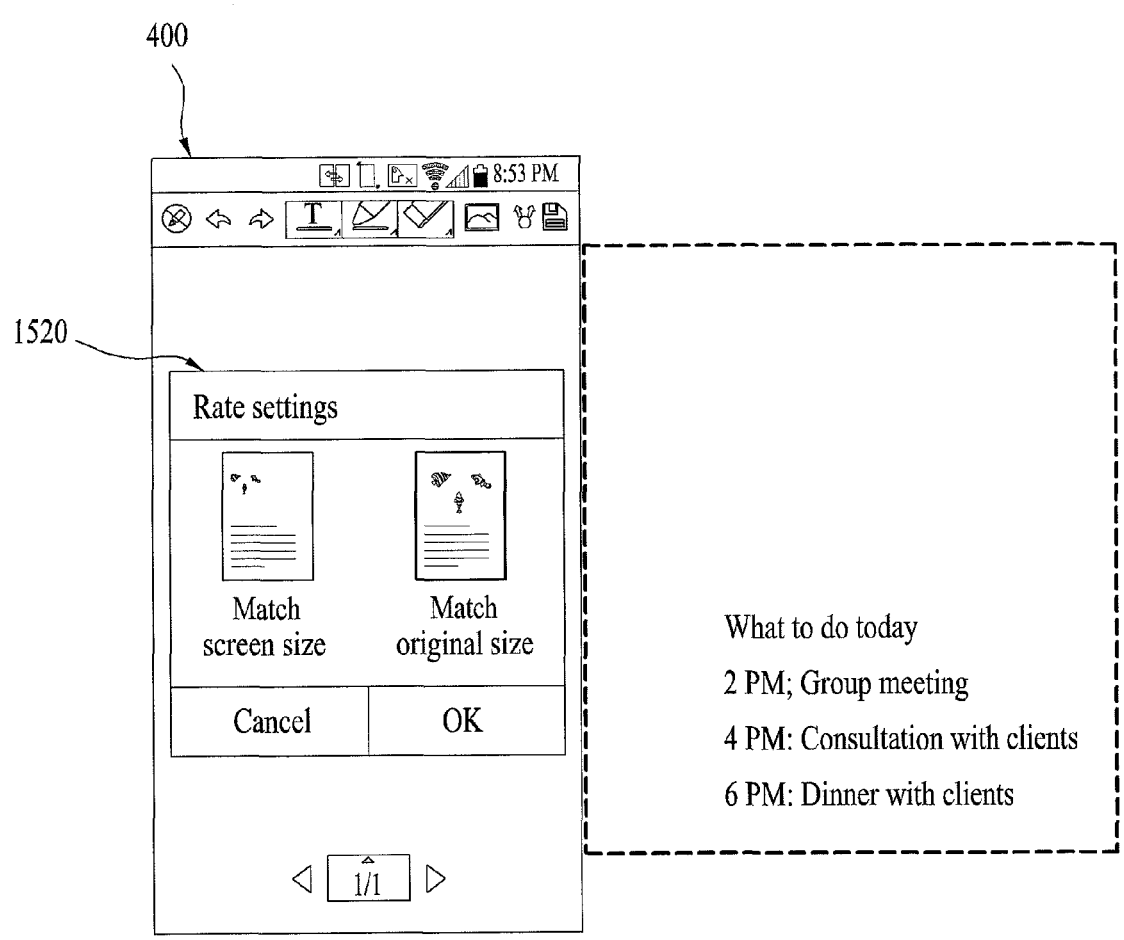
Figure 15C:
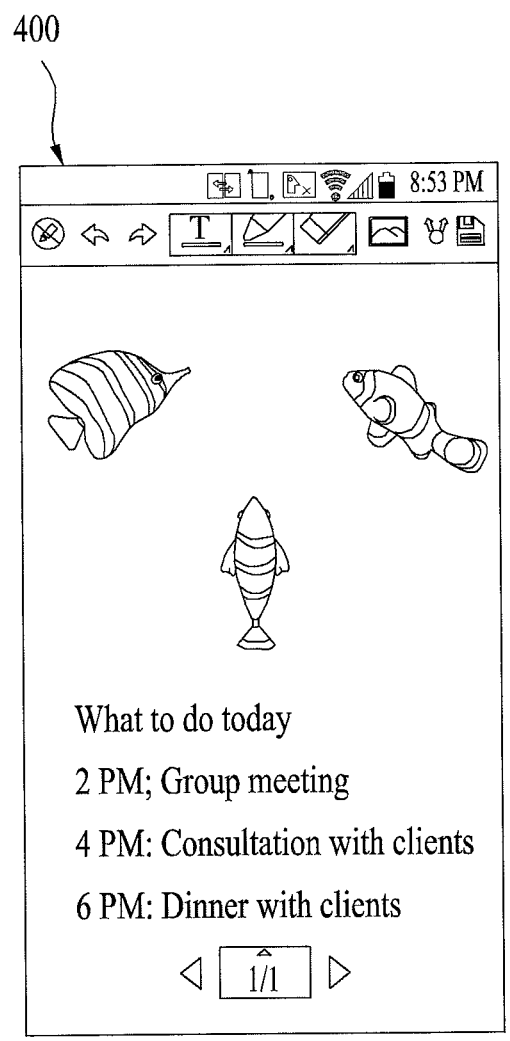

FIGS. 15A to 15C are diagrams to describe a process that a content included in a panorama document is rearranged in a normal document. Referring to FIGS. 15A to 15C, the controller 180 can control a full content included in a panorama document to be included in a normal document by decreasing a horizontal length of the panorama document into a length equal to or smaller than that of a horizontal side of the touchscreen 400. For instance, when an item 'change into a normal document' is selected from an overflow menu 1510 shown in FIG. 15A, referring to FIG. 15C, the controller 180 can control a full content included in the panorama document to be included in the normal document by decreasing the horizontal length of the panorama document.

The controller 180 can reduce a size of an image included in a panorama document in proportion to a reduction rate of the panorama document. For instance, if a horizontal length of the panorama document is reduced by ½, the controller 180 can reduce a size of an image included in the panorama document by ½. Prior to decreasing the horizontal length of the panorama document, referring to FIG. 15B, the controller 180 can display a rate setting menu for setting whether to reduce the image included in the panorama document. If an item 'match a screen size' is selected from the rate setting menu 1520 shown in FIG. 15B, the controller 180 can reduce a size of the image by an amount of the decreased horizontal length of the panorama document. On the other hand, if an item 'maintain an original size' is selected from the rate setting menu shown in FIG. 15B, the controller 180 can control the size of the image included in the normal document to be maintained equal to that in the panorama document irrespective of the horizontal length decrease of the panorama document.

The controller 180 can control a font size of a text not to be changed irrespective of the reduction rate of the panorama document. However, because a size of a text is too big, if the entire text cannot be included in a normal document unless a font size is changed, the controller 180 can decrease the font size of the text.

Figure 16A:
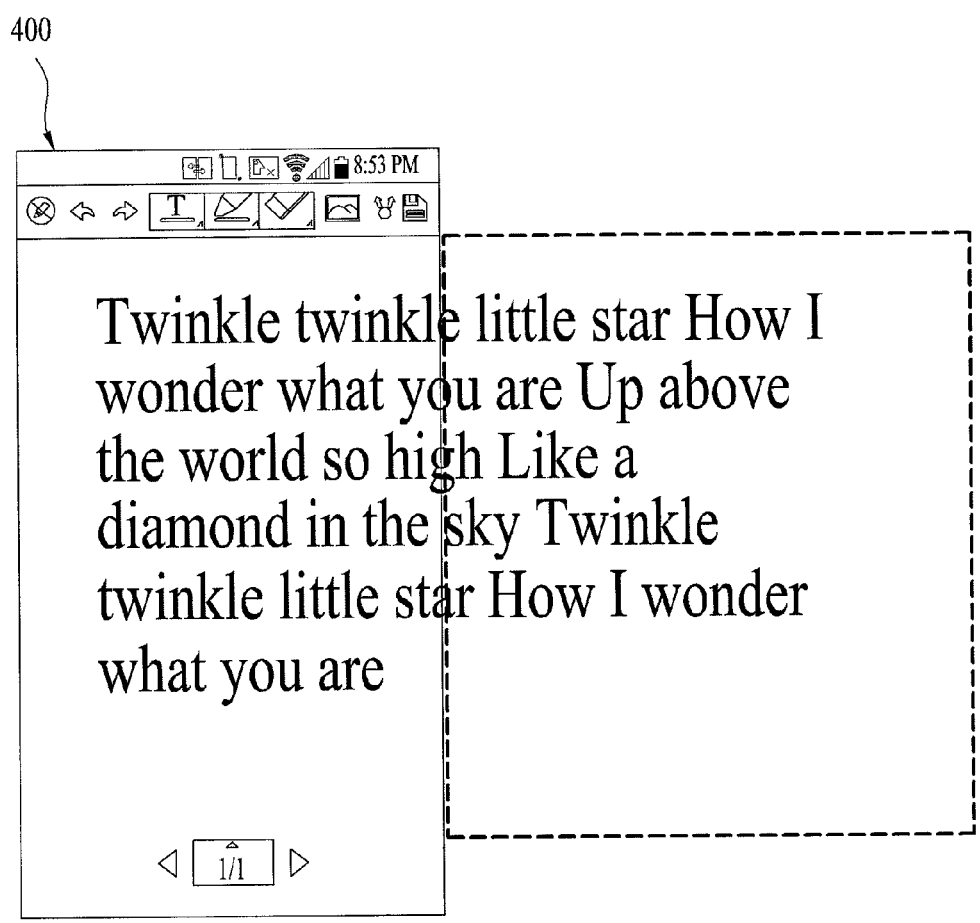
FIG. 16A and FIG. 16B are diagrams to describe a process for reducing a font size of a text included in a panorama document.
Figure 16B:
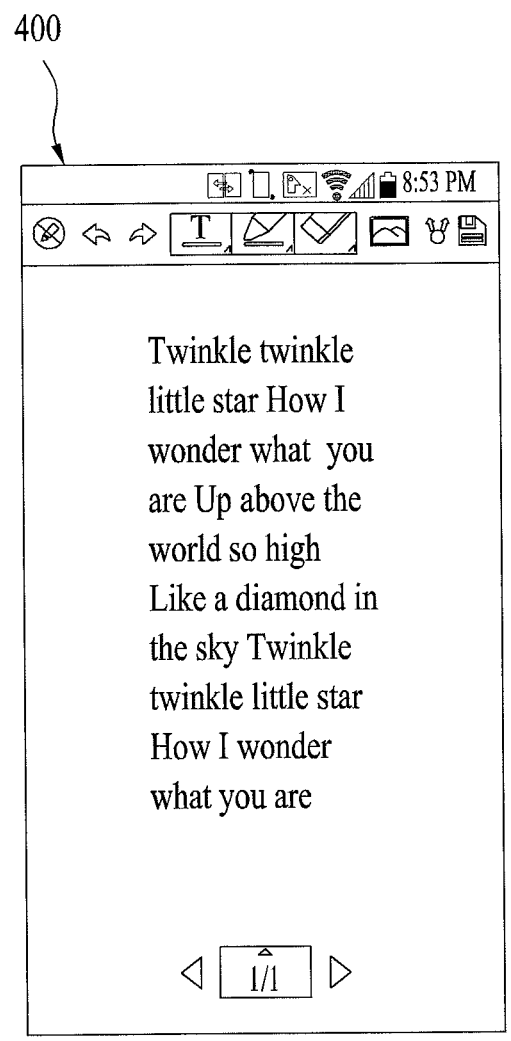

Next, FIG. 16A and FIG. 16B are diagrams to describe a process for reducing a font size of a text included in a panorama document. Referring to FIG. 16A and FIG. 16B, because a size of a text recorded in a panorama document is too big, if the entire text cannot be included in a normal document unless a font size is changed (FIG. 16A), the controller 180 can decrease a font size of the text in the normal document (FIG. 16B).

When a plurality of contents are included in a panorama document, the controller 180 can determine a content arrangement order depending on a location of the content. A process for determining a content arrangement order depending on a content location is described in detail with reference to FIG. 17 as follows.

Figure 17A:
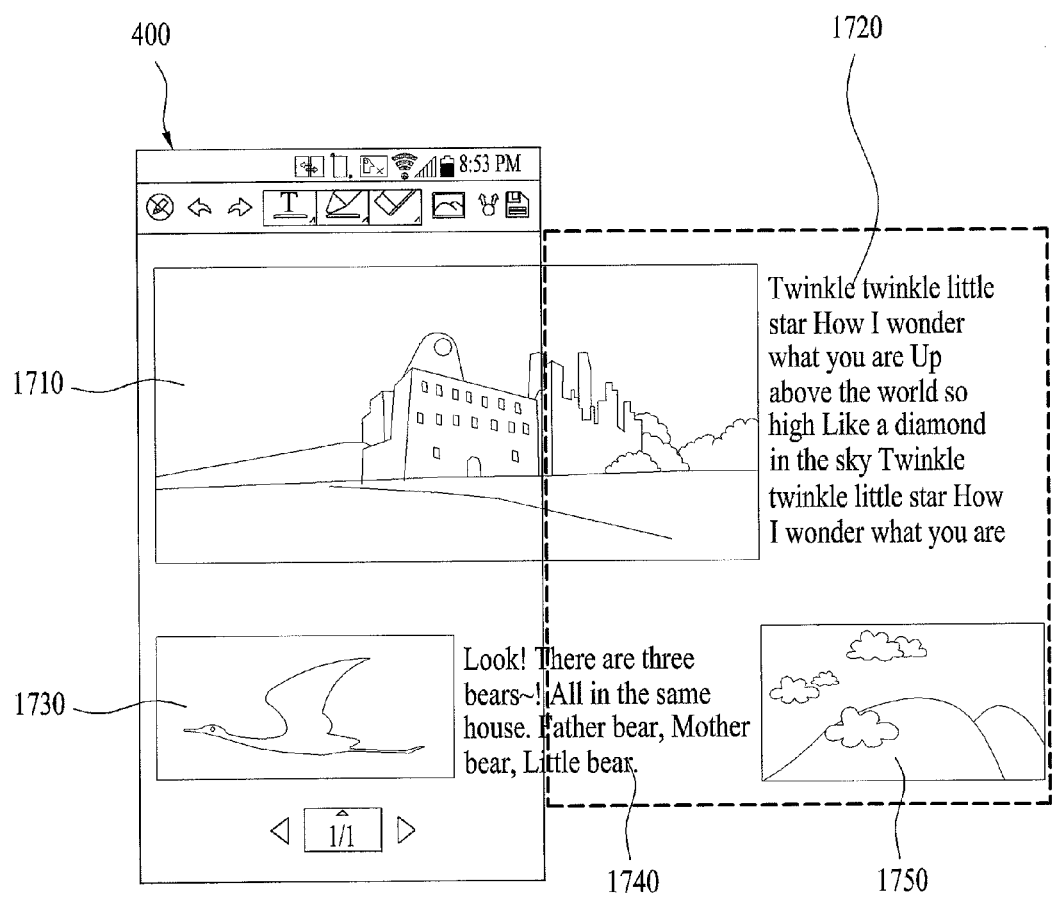
FIG. 17A and FIG. 17B are diagrams to describe a process for determining a content arrangement order depending on a content location in a panorama document.
Figure 17B:
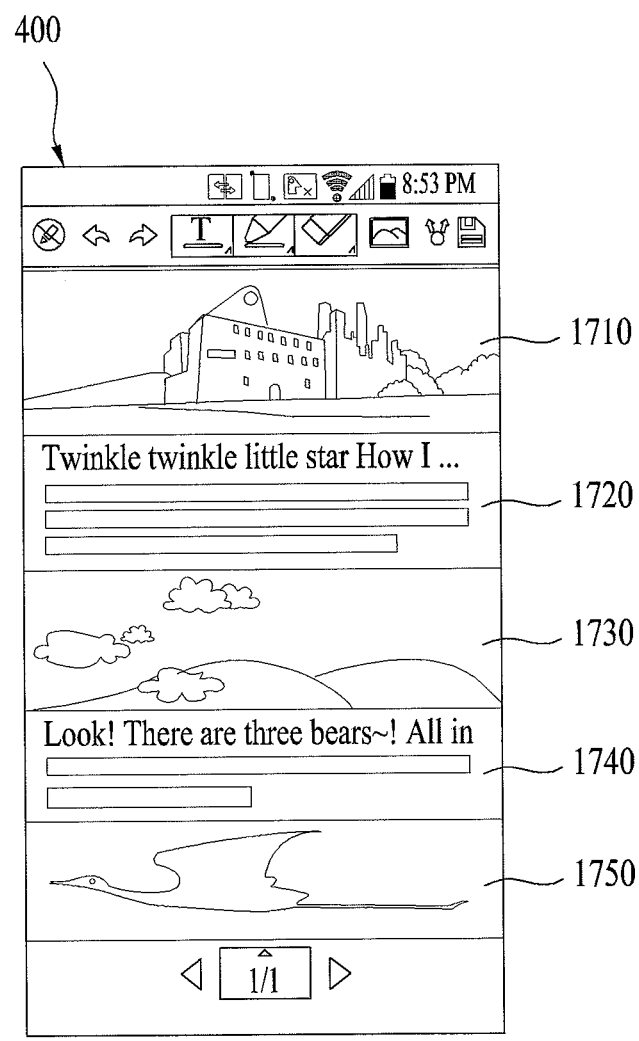

FIG. 17A and FIG. 17B are diagrams to describe a process for determining a content arrangement order depending on a content location in a panorama document. Referring to FIG. 17A and FIG. 17B, for clarity of the following description, assume that five contents 1710, 1720, 1730, 1740 and 1750 are included in a panorama document. When attempting to rearrange the contents included in the panorama document, the controller 180 can control the five contents 1710, 1720, 1730, 1740 and 1750 included in the panorama document to be arranged in order of the content located at a left top end to the content located at a right bottom end.

For instance, the controller 180 determines the orders of an image content 1710 located at a left top end of the panorama document, a text content 1720 located at a right top end of the panorama document, an image content 1730 located at a left bottom end of the panorama document, a text content 1740 located at a center bottom end and an image content 1750 located at a right bottom end as $1^{st}$ order, $2^{nd}$ order, $3^{rd}$ order, $4^{th}$ order and $5^{th}$ order, respectively (FIG. 17A) and can then control the contents to be arranged in the given order (FIG. 17B).

In the example shown in FIG. 17A and FIG. 17B, a priority of a content can be determined depending on a displayed location of the corresponding content. For instance, in the example shown in FIG. 17A and FIG. 17B, a content located at a top end has a priority higher than that of a content located at a bottom end. For example, among the contents located on the same level, the content located at a left side has a priority higher than that located at a right side, by which the present invention may be non-limited. Unlike the example shown in FIG. 17A and FIG. 17B, the controller 180 can determine a priority of a content depending on a type of the corresponding content.

Because a panorama document is larger than the touchscreen 400, it is unable to display a full content of the panorama document on the touchscreen 400 unless reduced in size. In this instance, it is unnecessary for a horizontal length of the panorama document to be fixed. For instance, as mentioned in the foregoing description of the example with reference to FIG. 12, if the horizontal length of the panorama document is determined in accordance with a moving distance of the pointers, the horizontal length of the panorama document may be changed in accordance with the moving distance of the two pointers. Moreover, if a vacant region exists in a panorama document, the mobile terminal according to an embodiment of the present invention can control a horizontal length of the panorama document to be automatically decreased. A process for decreasing a horizontal length of a panorama document automatically is described in detail with reference to FIG. 18 as follows.

Figure 18A:
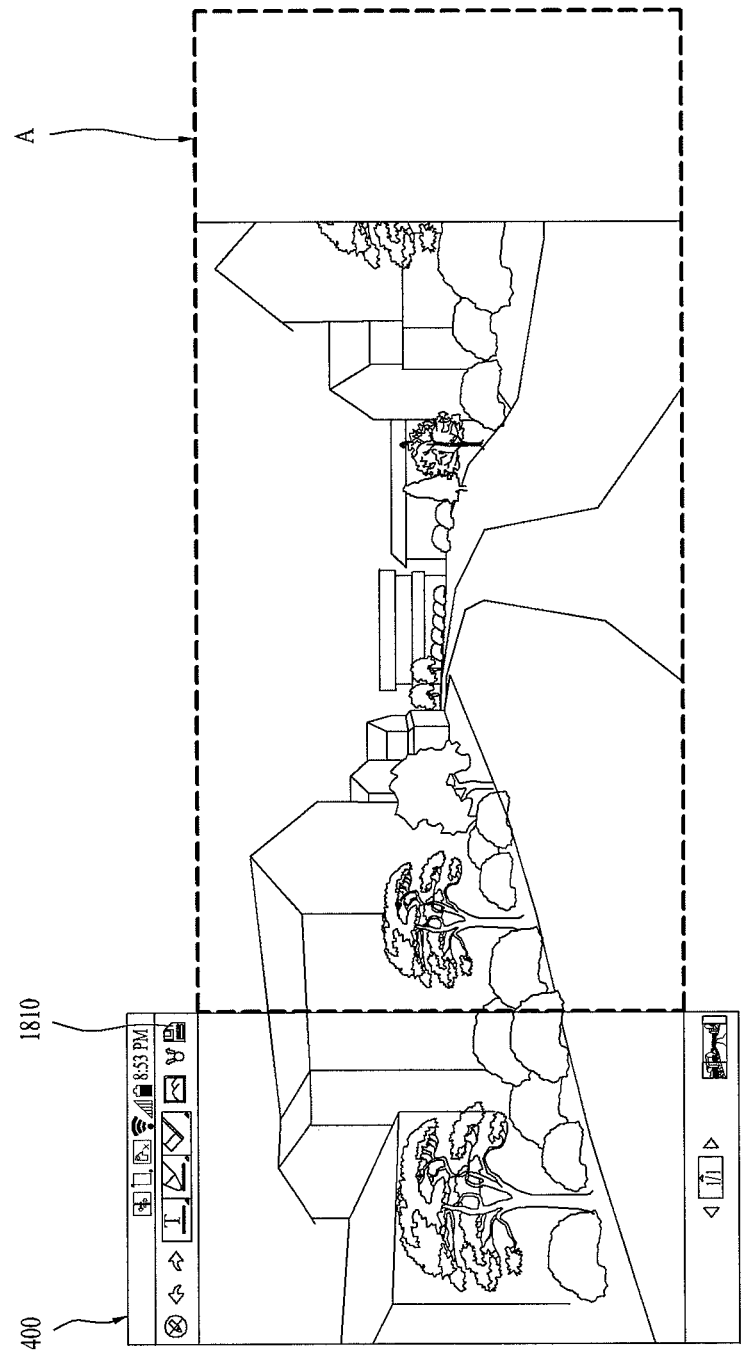
Figure 18C:
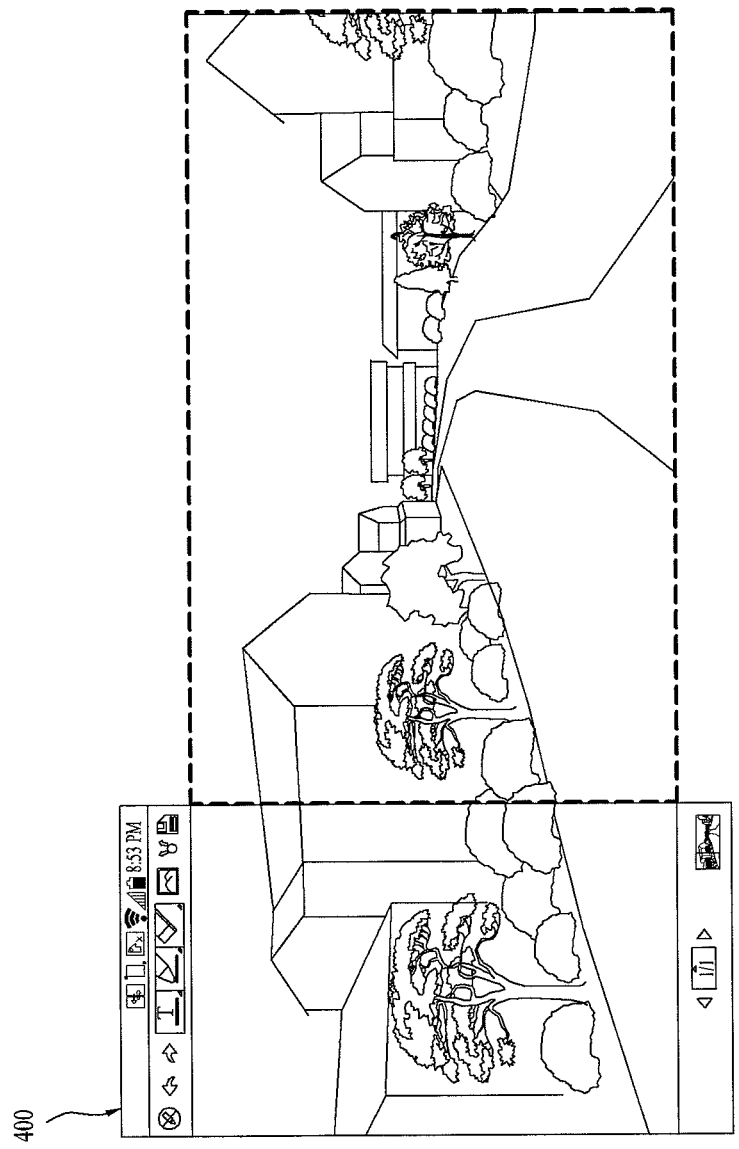

FIGS. 18A to 18C are diagrams to describe a process for decreasing a horizontal length of a panorama document automatically. Referring to FIGS. 18A to 18C, for clarity of the following description, assume that a vacant region A exists on a right side of a panorama document.

Once editing of the panorama document is complete, the controller 180 can control a horizontal length of the panorama document to be decreased by deleting the vacant region A of the panorama document. For instance, if a save button 1810 is touched in the example shown in FIG. 18A, referring to FIG. 18B, the controller 180 can display a setting menu 1820 for setting whether to decrease the horizontal length of the panorama document. In the setting menu 1820 shown in FIG. 18B, an item 'save a full page' 1822 is provided to save the panorama document without deleting the vacant region A and an item 'save a page to match a content' 1824 is provided to save the panorama document after deleting the vacant region A. If the item 'save a page to match a content 1824 is selected from the setting menu shown in FIG. 18B, referring to FIG. 18C, the controller 180 can control the horizontal length of the panorama document to be decreased by deleting the vacant region A of the panorama document.

If a document creating application for reading or editing a normal document and a panorama document is activated, as mentioned in the foregoing description with reference to FIG. 4, the controller 180 can display a list of normal and panorama documents saved in the memory 160. In particular, like the example shown in FIG. 4, the controller 180 can display thumbnails of documents in a plurality of boxes partitioned by X-rows and T-columns, respectively.

In this instance, the thumbnail of the corresponding document may include a thumbnail image of a $1^{st}$ or last page of the corresponding document or an icon representing the corresponding document. In addition to the thumbnail of the document, the controller 180 can control at least one of a document title, a document created time and date, a document modified time and data and the like to be further displayed. In particular, the controller 180 can display a document list in a manner that documents in the document list are arranged in ascending or descending order of the document created time and date, the document modified time and date or the document title.

In order to discriminate a normal document and a panorama document from each other, the controller 180 controls a thumbnail of the normal document to occupy a box and also controls a thumbnail of the panorama document to occupy at least two boxes, for example. However, if the boxes for displaying the thumbnail of the panorama document are insufficient, the controller 180 can control the thumbnail of the normal document to be preferentially displayed prior to the thumbnail of the panorama document. This is described in detail with reference to FIG. 19 as follows.

FIG. 19 is a diagram illustrating one example of a process for displaying a document list. Referring to FIG. 19, for clarity of the following description, assume that each row for displaying thumbnails of normal and panorama documents includes 3 boxes and that the document creating buttons 1902 and 1904 are displayed in a $1^{st}$ box of a $1^{st}$ row. Moreover, assume that a document list shown in FIG. 19 is arranged in ascending order of document titles and that a thumbnail of a normal document and a thumbnail of a panorama document occupy one box and two boxes, respectively.

In the example shown in FIG. 19, a normal document named 'ABC cafe', a normal document named 'Zoo' and a panorama document 'Christmas tree' are displayed. If the document names are arranged in ascending order, a thumbnail of the normal document named 'ABC café', a thumbnail of the panorama document named 'Christmas tree' and a thumbnail of the normal document named 'Zoo' should be located in order.

In the above-enumerated order, if the thumbnail of the normal document named 'ABC café' is displayed in a $1^{st}$ row and a $2^{nd}$ column, since a remaining box on the $1^{st}$ row includes one box in the $1^{st}$ row and $3^{rd}$ column only, it is unable to display the thumbnail of the panorama document named 'Christmas tree'. Hence, referring to FIG. 19, the controller 180 displays the thumbnail of the normal document named 'Zoo' in the $1^{st}$ row and the $3^{rd}$ column by switching the order of the normal document named 'Zoo' in order next to that of the panorama document and the order of the panorama document named 'Christmas tree' to each other and can displays the thumbnail of the panorama document named 'Christmas tree' in a $2^{nd}$ row and $1^{st}$ and $2^{nd}$ columns.

If a mobile terminal while editing a panorama document is connected to an external display device, the controller 180 performs a mirroring for displaying the same output image of the touchscreen 400 through the external display device. Alternatively, the controller 180 displays an editing screen of the panorama document on at least one of the external display device and the touchscreen 400 and also displays a full content of the panorama document on the other. This is described in detail with reference to FIG. 20 as follows.

Figure 20A:
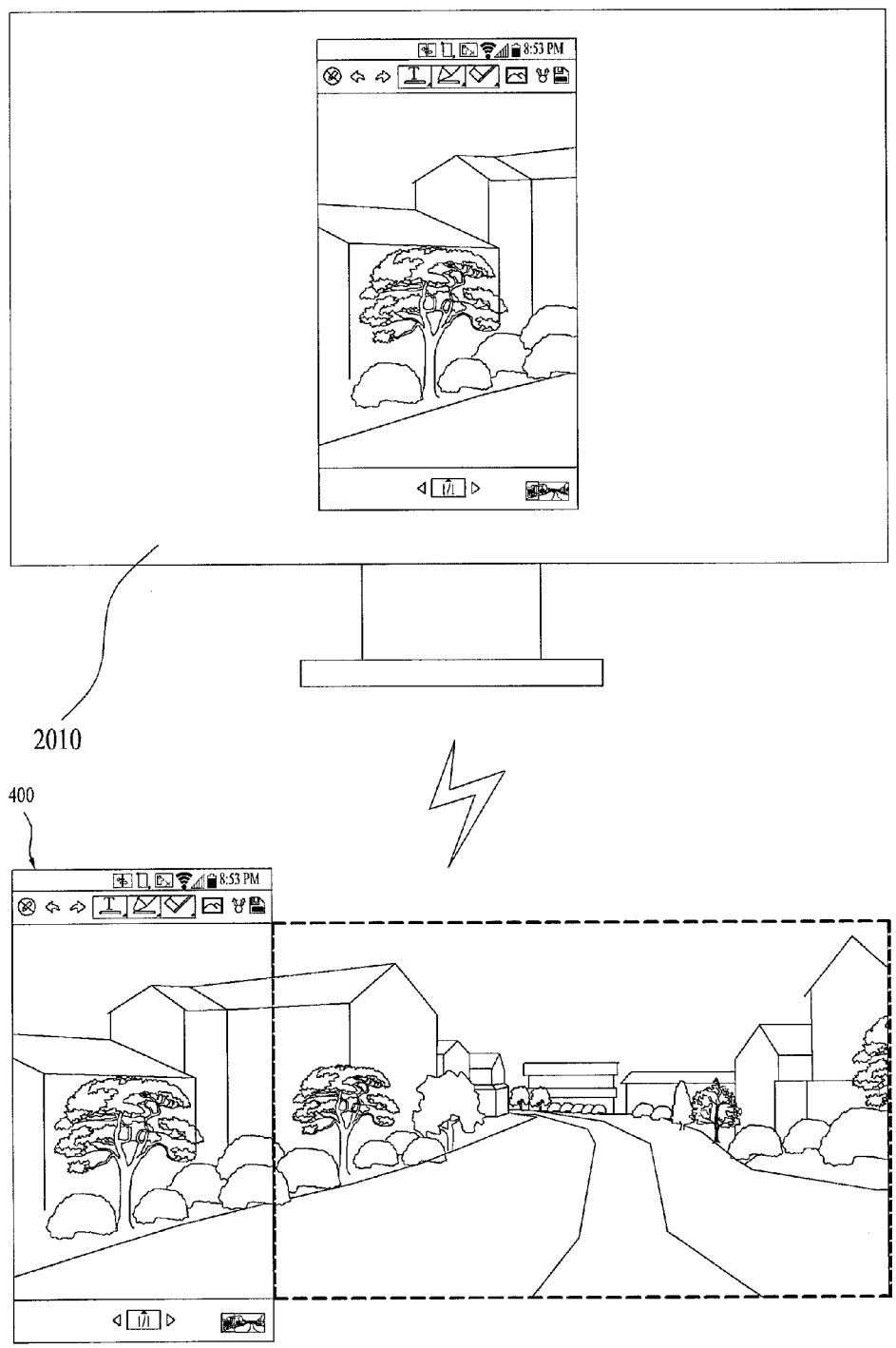

FIG. 20A and FIG. 20B are diagrams illustrating one example to describe an operation when a mobile terminal is connected to an external display device. For clarity of the following description, assume that the external display device includes a TV 2010. Referring to FIG. 20A, if the mobile terminal while editing a panorama document is connected to an external display device, the controller 180 can control a real-time output image of the touchscreen 400 to be transmitted to the TV 2010 in order for the same panorama document editing screen of the touchscreen 400 to be output through the TV 2010.

Unlike the example shown in FIG. 20A, referring to FIG. 20B, if the mobile terminal while editing a panorama document is connected to an external display device, the controller 180 controls an editing screen of the panorama document to be exactly displayed through the touchscreen 400 and also controls a thumbnail of the panorama document to be transmitted to the TV 2010 in order for a full content of the panorama document to be displayed through the TV 2010. Thus, it is advantageous in that a user can check the edited panorama document by real time through the TV 2010 while editing the panorama document through the mobile terminal.

When the full content of the panorama document is displayed through the external display device, the controller 180 can control document information of the panorama document to be additionally displayed. In this instance, the document information may include at least one of a document name, a creator, a created date and a final modification date. In the example shown in FIG. 20, the document name 2012 of the panorama document and the creator 2014 of the panorama document are displayed.

If the mobile terminal while editing a panorama document is connected to a plurality of external display devices, the controller 180 controls the same panorama document editing image of the touchscreen 400 to be displayed at least one of a plurality of the external devices and also controls a full region of the panorama document to be displayed on the rest of the external devices, for example.

In the above description so far, the panorama document is explained. Based on the above description, an operation of the mobile terminal according to an embodiment of the present invention is described in detail as follows.

Figure 21:
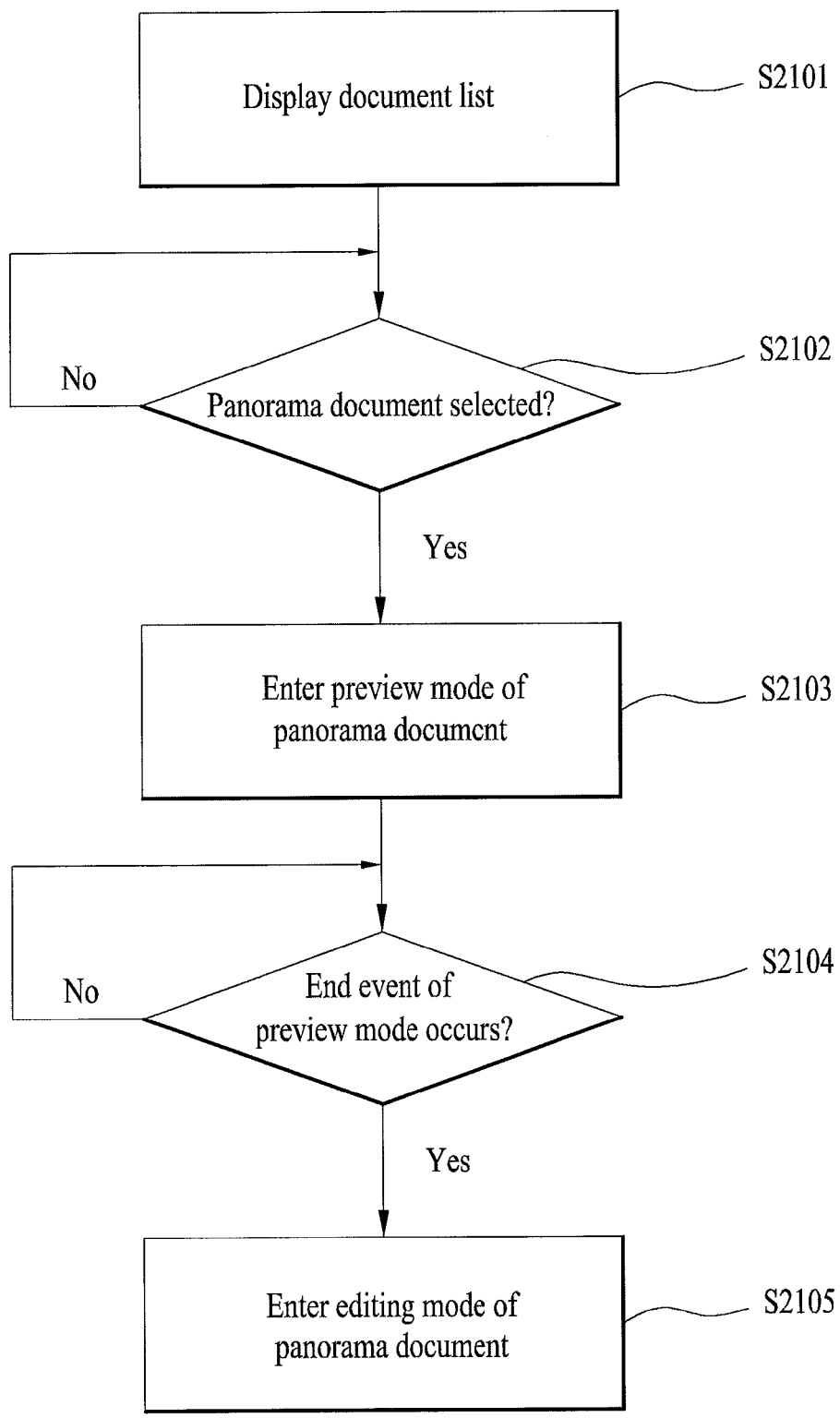
FIG. 21 is a flowchart for an operation of a mobile terminal according to one embodiment of the present invention.

FIG. 21 is a flowchart for an operation of a mobile terminal according to one embodiment of the present invention. Referring to FIG. 21, if a document creating application is activated, the controller 180 can display a list of documents saved in the memory 160 (S2101). The controller 180 discriminates selecting a normal document from the document list and selecting a panorama document from the document list from each other.

If the panorama document is selected from the document list (Yes in S2102), the controller 180 can enter a preview mode to give an overview of a full content of the panorama document before entering an editing mode of the panorama document (S2103). If the preview mode is entered, the controller 180 can control the panorama document to be scrolled in at least one direction to give an overview of a full content of the panorama document to a user. Because a full content of the normal document can be displayed on the touchscreen 400 without reducing the normal document, if the normal document is selected from the document list, the controller 180 can control an editing mode of the normal document to be initiated without entering the preview mode.

In the following description, an operation of the mobile terminal in the preview mode is explained in detail with reference to the accompanying drawings. For clarity of the following description, when a preview mode is initially entered, assume that the controller 180 scrolls a panorama document in a left-to-right direction.

Figure 22:
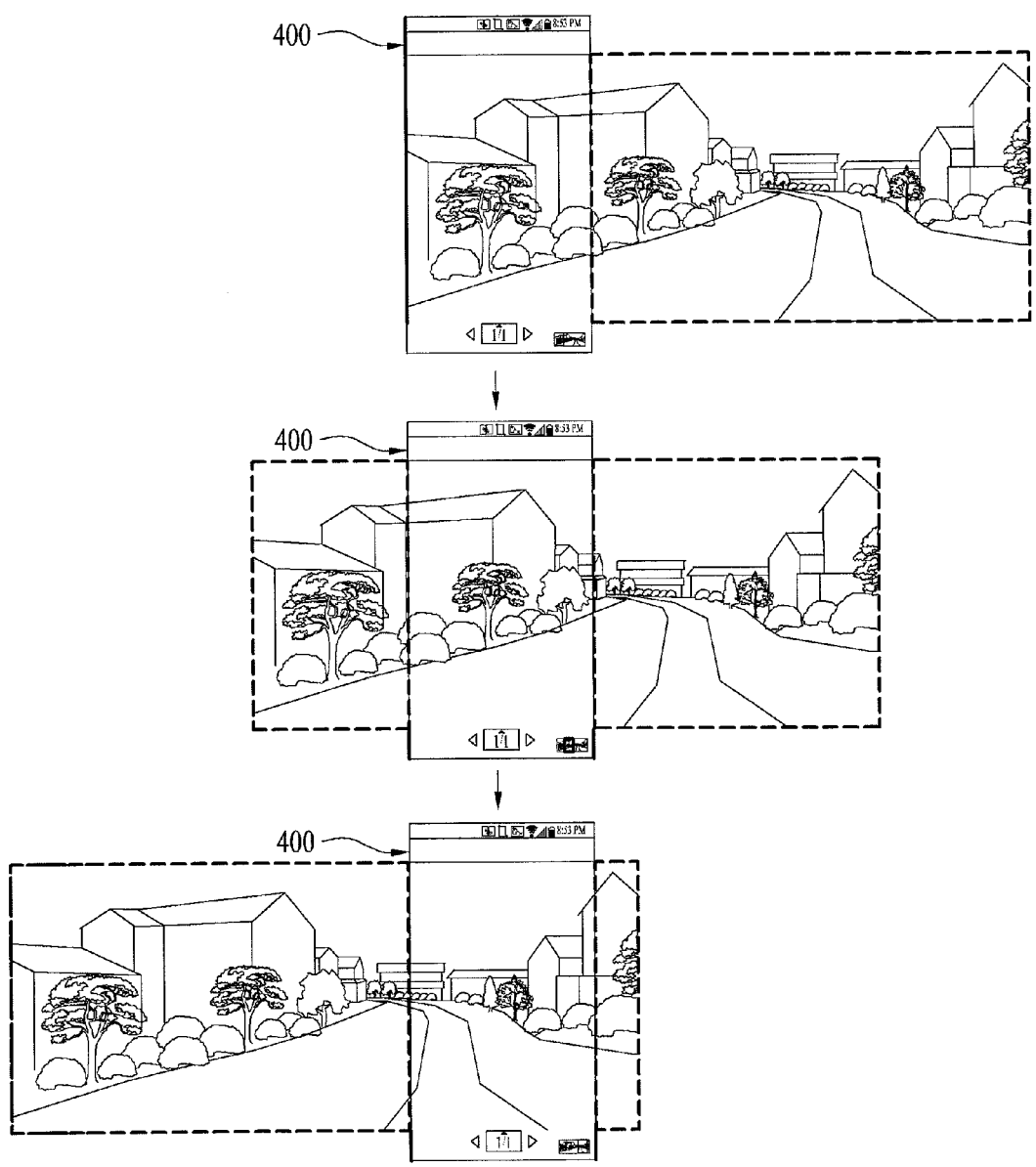
FIG. 22 is a diagram illustrating one example to describe a preview mode of a panorama document.

FIG. 22 is a diagram illustrating one example to describe a preview mode of a panorama document. Referring to FIG. 22, before entering an editing mode of a panorama document, the controller 180 can enter a preview mode for scrolling the panorama document in right and left directions. The controller 180 controlling the panorama document to be automatically scrolled in left-to-right direction, thereby giving an overview of a full content of the panorama document to a user.

While the panorama document is being scrolled, if an inclination of the mobile terminal 100 is detected, the controller 180 can control a scroll speed of the panorama document to be changed or control a scroll direction of the panorama document to be changed. This is described in detail with reference to FIG. 23 as follows.

FIGS. 23A to 23C are diagrams illustrating one example to describe an operation of a mobile terminal when an inclination of the mobile terminal is detected. Referring to FIG. 23A, if the mobile terminal does not incline, assume that the controller 180 scrolls a panorama document in left-to-right direction.

While the panorama document is being scrolled in the left-to-right direction, if the mobile terminal inclines clockwise (i.e., if the mobile terminal inclines in a scroll direction of the panorama document), referring to FIG. 23B, the controller 180 can control a scroll speed of the panorama document to increase.

On the other hand, while the panorama document is being scrolled in the left-to-right direction, if the mobile terminal inclines counterclockwise (i.e., if the mobile terminal inclines in a direction reverse to the scroll direction of the panorama document), the controller 180 can control a scroll speed of the panorama document to decrease or control the scroll direction of the panorama document to be changed into a left direction from a right direction. In the example shown in FIG. 23C, if the mobile terminal inclines counterclockwise, the scroll direction of the panorama document is changed into the left direction from the right direction.

According to another embodiment of the present invention, when detecting an inclination of the mobile terminal, the controller 180 can control a scroll of a next or previous page of a panorama document. Assuming that the panorama document includes a plurality of pages, while a prescribed page of the panorama document is being scrolled, if the mobile terminal inclines clockwise or counterclockwise, the controller 180 can control a page next or previous to the prescribed page to be scrolled.

While a panorama document is being scrolled in preview mode, the controller 180 can display document information of the panorama document. In this instance, as mentioned in the foregoing description with reference to FIG. 20, the document information can include at least one of a document name, a creator, a created date and a final modification date.

When a panorama document includes a secret message, the controller 180 can display the secret message while the panorama document is scrolled. In this instance, the secret message is a message displayed in preview mode only. After the preview mode of the panorama document has been ended, if an editing mode of the panorama document is entered, the secret message is not displayed anymore. This is described in detail with reference to FIG. 24 as follows.

FIG. 24(a) and FIG. 24(b) are diagrams illustrating one example to describe a secret message. Assume that FIG. 24(a) shows one example of a preview mode for scrolling a panorama document in left-to-right direction. Further, assume that FIG. 24(b) shows one example of an editing mode of a panorama document.

Referring to FIG. 24(a), if it is determined that a panorama document includes a secret message 2410, the controller 180 can display the secret message 2410 while the panorama document is being scrolled. Thereafter, referring to FIG. 24(b), as the preview mode is ended, if an editing mode of the panorama document is entered, the controller 180 can control the secret message 2410 to stop being displayed. In particular, the secret message 2410 can be regarded as a message displayed on scrolling the panorama document in preview mode.

The secret message 2410 can be set by a user input in the editing mode of the panorama document. For instance, the item 'set a secret message' in the overflow menu 1410/1510 shown in FIG. 14A/15A may be provided to set a message displayed while the panorama document is automatically scrolled in the preview mode. If the secret message setting item is touched in FIG. 14A/15A, a user can set the secret message by inputting a text.

If the panorama document is received externally, the secret message may be created by a different user. When a panorama document is shared, a sharer or a sharing counterpart can control a message, which is intended to be delivered to a counterpart, to be displayed using the secret message when a preview mode of the panorama mode starts.

If the panorama document is determined as including a music file, the controller 180 can control the music file attached to the panorama document to be played while the panorama document is scrolled. Hence, a user can easily determine what kind of a music file is included in the panorama document.

Referring now to FIG. 21, in the mobile terminal according to an embodiment of the present invention, if an end event of the preview mode occurs (S2104), the controller 180 ends the preview mode of the panorama document and can then enter an editing mode for editing the panorama document (S2105). In this instance, the end event of the preview mode may include at least one of i) receiving a user's touch input while scrolling the panorama document; ii) completing the scroll of the panorama document; and iii) receiving a user's touch input in a complete state of the scroll of the panorama document. A process for ending a preview mode of a panorama document is described in detail with reference to FIG. 25 as follows.

Figure 25A:
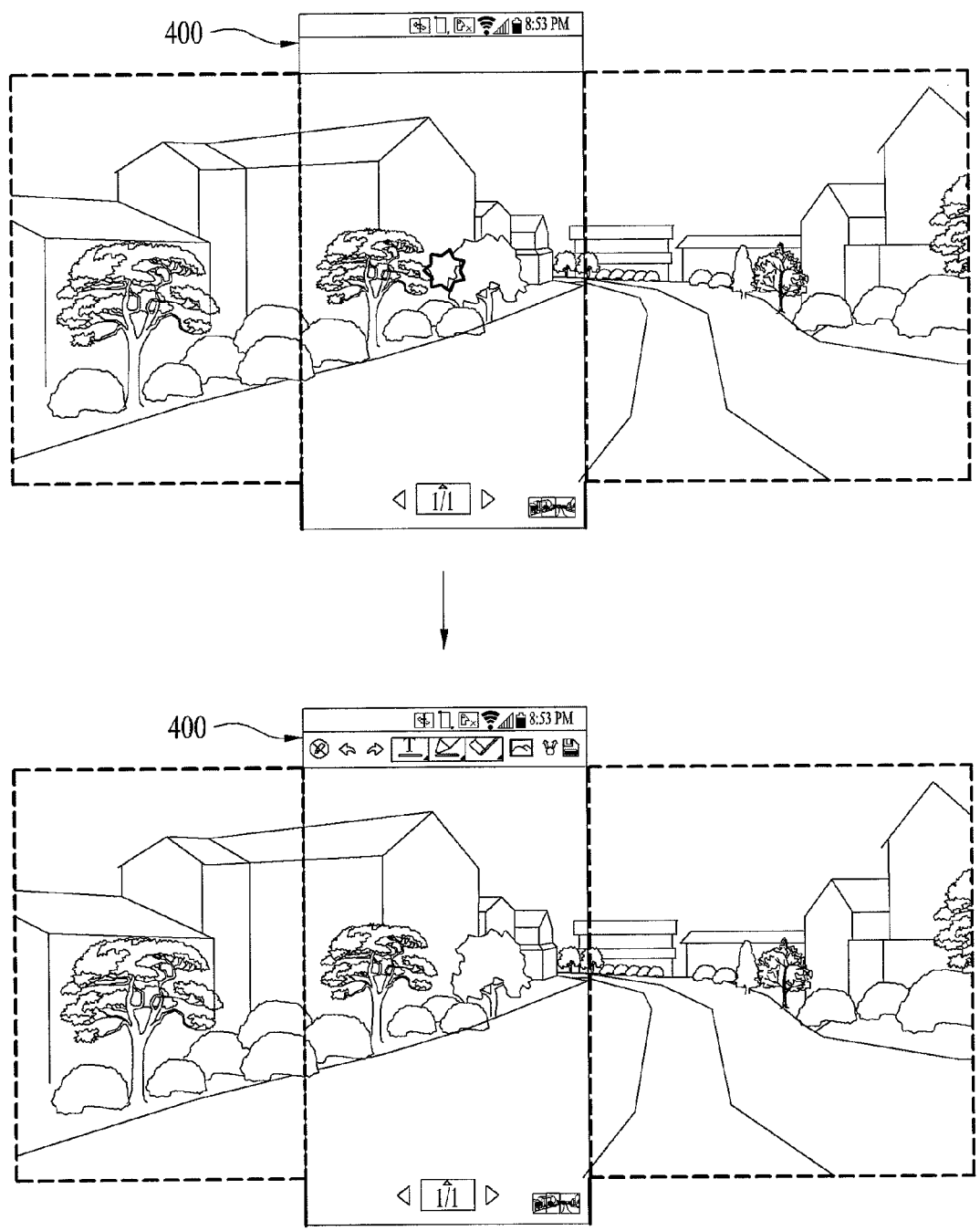
FIG. 25A and FIG. 25B are diagrams illustrating one example to describe a process for initiating an editing mode of a panorama document after ending a preview mode of the panorama document.
Figure 25B:
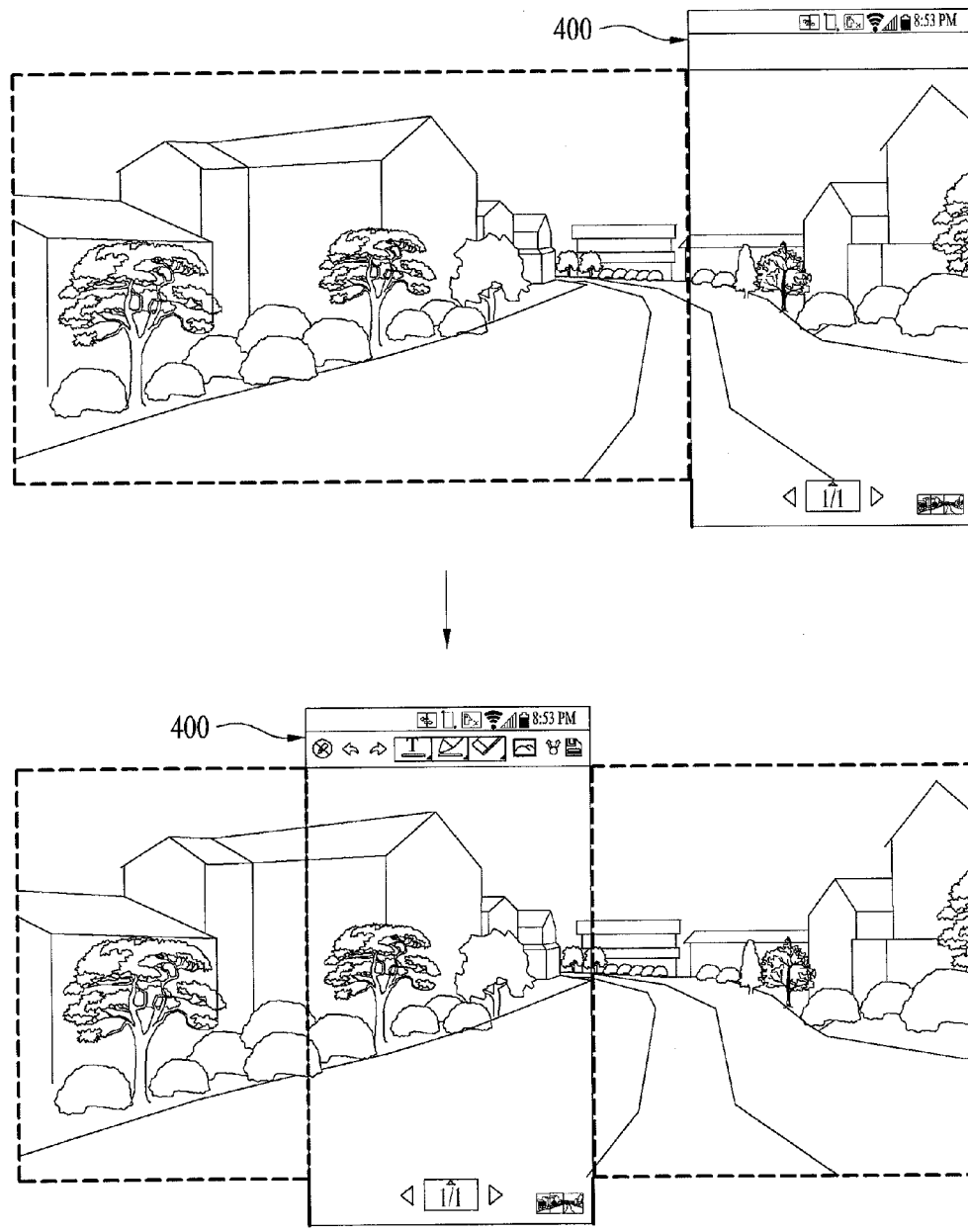

FIG. 25A and FIG. 25B are diagrams illustrating one example to describe a process for initiating an editing mode of a panorama document after ending a preview mode of the panorama document. For clarity of the following description, assume that a panorama document is scrolled in left-to-right direction in preview mode of the panorama document.

Referring to FIG. 25A, while a panorama document is being scrolled in left-to-right direction, if a user's touch input is received, the controller 180 ends a preview mode of the panorama document and can then start an editing mode of the panorama document. In doing so, like the example shown in FIG. 25A, the controller 180 can control a last displayed region in the preview mode on initiating the editing mode of the panorama document (i.e., a region output through the touchscreen 400 on receiving the user's touch input) to be displayed. Hence, if a user finds a region to edit while overviewing the panorama document, the user can initiate the editing of the region to edit by touching the touchscreen 400 only.

Referring to FIG. 25B, if the scroll of the panorama document is complete, the controller 180 ends the preview mode of the panorama document and can then start an editing mode of the panorama document to be initiated. When the editing mode of the panorama document is initiated, the controller 180 can display a preset region.

For instance, the preset region may indicate a start screen displayed on initiating a scroll of the panorama document or an end screen displayed on ending the scroll of the panorama document. Like the example shown in FIG. 22, if the panorama document is scrolled in the left-to-right direction, the start screen of the panorama document and the end screen of the panorama document may mean a region located at a far left side of the panorama document and a region located at a far right side of the panorama document, respectively.

In another instance, when an editing mode of the panorama document is initiated, the controller 180 can display a region last edited by a user in the past. This is to secure continuity of the user's editing job. When the editing mode of the panorama document is initiated, in order to display the region last edited by the user, if the editing of the panorama document is ended, the controller 180 can save information on the last displayed region. For example, if the region last edited by the user is a center part of the panorama document, referring to FIG. 25B, the controller 180 initiates the editing mode and can display the center part of the panorama document.

Accordingly, embodiments of the present invention provide several advantages.

First of all, the present invention provides a mobile terminal, thereby enhancing user's convenience. In particular, if a size of a document is not enough to attach data in a desired size, the present invention can provide a mobile terminal capable of extending the size of the document.

Secondly, the present invention can provide a mobile terminal, thereby enabling a user to easily recognize a full content of a document before editing the document in a size greater than that of a display unit of the mobile terminal.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a computer system are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a memory configured to store data;
    a touchscreen display; and
    a controller configured to:
        display a first portion of a panoramic file selected from the memory, said panoramic file having a display size greater than that of the touchscreen display,
        automatically scroll the panoramic file in at least one direction so as to display another portion of the panoramic file,
        display a secret message included in the panoramic file together with a content of the panoramic file while the panoramic file is automatically scrolled,
        when the scrolling of the panoramic file is stopped, stop displaying the secret message and display an option for editing the secret message, and
        display a mini-map on the touchscreen display displaying an entire portion of the panoramic file and a frame region indicating where the displayed first portion exists within the entire portion of the panoramic file along with the displayed first portion.

2. The mobile terminal of claim 1, wherein if the mobile terminal is tilted in a first direction, the controller is configured to increase a scrolling speed of the panoramic file, and
    wherein if the mobile terminal is tilted in a second direction, the controller is configured to decreased the scrolling speed of the panoramic file.

3. The mobile terminal of claim 2, wherein a degree of an increment or a decrement of the scrolling speed corresponds to an inclination of the mobile terminal.

4. The mobile terminal of claim 1, wherein the controller is further configured to stop scrolling of the panoramic file in response to a preset input.

5. The mobile terminal of claim 4, wherein the controller is configured to display a portion of the panoramic file which is displayed when the preset input is received after stopping the scrolling of the panoramic file.

6. The mobile terminal of claim 1, wherein the controller is further configured to display a thumbnail image of an entire portion of the panoramic file on the touchscreen display along with the displayed first portion.

7. The mobile terminal of claim 1, wherein the controller is further configured to display the first portion of the panoramic file when the mobile terminal is positioned in a portrait mode and display an entire portion of the panoramic file when the mobile terminal is positioned in a landscape mode.

8. The mobile terminal of claim 7, wherein the controller is further configured to display at least one edit option for editing the panoramic file when the mobile terminal is positioned in the portrait mode and not display the at least one edit option when the mobile terminal is positioned in the landscape mode.

9. The mobile terminal of claim 7, wherein the first portion displayed in the portrait mode corresponds to a predetermined center portion of the panoramic file when displayed in the landscape mode.

10. The mobile terminal of claim 1, wherein the controller is further configured to display a first option for changing a non-panoramic file stored in the memory into the panoramic file and to display a second option for changing the panoramic file into the non-panoramic file.

11. The mobile terminal of claim 10, wherein the controller is further configured to rearrange content in the panoramic file based on a preset priority when changing the panoramic file into the non-panoramic file.

12. The mobile terminal of claim 1, wherein the panoramic file includes a panoramic document or panoramic image including at least one of:
   i) a document or image having a horizontal length greater than a length of a horizontal size of the touchscreen display;
   ii) a document or image having a vertical length greater than a length of a vertical side of the touchscreen display; and
   iii) a document or image having horizontal and vertical lengths greater than lengths of horizontal and vertical sides of the touchscreen display.

13. The mobile terminal of claim 1, wherein the controller is further configured to display an editing screen for editing the panoramic file when the scrolling of the panoramic file reaches an end of the panoramic file.

14. The mobile terminal of claim 1, further comprising:
   a camera configured to photograph an object,
   wherein the controller is further configured to automatically set a mode of the camera to a panoramic photographing mode when the camera is activated to take a photo to attach to the panoramic file.

15. The mobile terminal of claim 1, wherein the controller is further configured to display file information about the panoramic file while the panoramic file is scrolled, and
   wherein the file information includes at least one of a file name of the panoramic file, a created date of the panoramic file, a final modification date of the panoramic file and a creator of the panoramic file.

16. The mobile terminal of claim 1, wherein the controller is further configured to output a music file attached to the panoramic file while the panoramic file is scrolled.

17. The mobile terminal of claim 1, further comprising:
   a microphone configured to receive an input of audio,
   wherein the controller is further configured to record the input audio and attach the recorded audio to the panoramic file.

18. A method of controlling a mobile terminal, the method comprising:
   displaying, via a touchscreen display, a first portion of a panoramic file selected from a memory of the mobile terminal, said panoramic file having a display size greater than that of the touchscreen display;
   automatically scrolling, via a controller of the mobile terminal, the panoramic file in at least one direction so as to display another portion of the panoramic file;
   displaying a secret message included in the panoramic file together with a content of the panoramic file while the panoramic file is automatically scrolled;
   when the scrolling the panoramic file is stopped, stopping displaying the secret message and displaying an option for editing the secret message, and
   display a mini-map on the touchscreen display displaying an entire portion of the panoramic file and a frame region indicating where the displayed first portion exists within the entire portion of the panoramic file along with the displayed first portion.

* * * * *